United States Patent
Dutta et al.

(10) Patent No.: US 12,513,530 B2
(45) Date of Patent: Dec. 30, 2025

(54) CO-CHANNEL COEXISTENCE IN DIFFERENT RADIO ACCESS TECHNOLOGIES FOR SIDELINK COMMUNICATION

(71) Applicant: QUALCOMM Incorporated, San Diego, CA (US)

(72) Inventors: Sourjya Dutta, San Diego, CA (US); Gabi Sarkis, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 699 days.

(21) Appl. No.: 17/881,460

(22) Filed: Aug. 4, 2022

(65) Prior Publication Data

US 2024/0048995 A1 Feb. 8, 2024

(51) Int. Cl.
*H04W 16/14* (2009.01)
*H04W 24/10* (2009.01)
*H04W 28/26* (2009.01)

(52) U.S. Cl.
CPC .......... *H04W 16/14* (2013.01); *H04W 24/10* (2013.01); *H04W 28/26* (2013.01)

(58) Field of Classification Search
None
See application file for complete search history.

(56) References Cited

U.S. PATENT DOCUMENTS

| | | | | |
|---|---|---|---|---|
| 11,627,501 | B2* | 4/2023 | Nguyen | H04W 4/40 370/329 |
| 2018/0234889 | A1* | 8/2018 | Baghel | H04W 24/08 |
| 2019/0200361 | A1* | 6/2019 | Sartori | H04W 4/80 |
| 2019/0313279 | A1* | 10/2019 | Li | H04W 72/12 |
| 2020/0314959 | A1* | 10/2020 | Agiwal | H04W 76/27 |
| 2021/0314796 | A1* | 10/2021 | Hoang | H04W 72/04 |
| 2022/0030555 | A1* | 1/2022 | Chae | H04W 72/02 |
| 2022/0279536 | A1* | 9/2022 | Khsiba | H04W 72/1263 |
| 2022/0287083 | A1* | 9/2022 | Gomes Baltar | H04W 74/0808 |

(Continued)

FOREIGN PATENT DOCUMENTS

| | | |
|---|---|---|
| WO | 2022150247 A1 | 7/2022 |
| WO | 2023115072 A2 | 6/2023 |

OTHER PUBLICATIONS

International Search Report and Written Opinion—PCT/US2023/070628—ISA/EPO—Oct. 18, 2023.

*Primary Examiner* — Mariela Vidal Carpio
(74) *Attorney, Agent, or Firm* — QUALCOMM Incorporated

(57) ABSTRACT

Aspects relate to techniques for enabling co-channel coexistence in different radio access technologies (RATs) for sidelink communication. A wireless communication device may be configured to receive at least one resource reservation message using a first RAT. For example, each resource reservation message may identify at least one resource of a plurality of resources of a sidelink channel for a respective sidelink transmission using the first RAT. The wireless communication device may further be configured to estimate a channel occupancy of the sidelink channel of a second RAT based on measurements obtained over a total number of the plurality of resources and the at least one resource reservation message.

28 Claims, 16 Drawing Sheets

(56) References Cited

U.S. PATENT DOCUMENTS

| | | | |
|---|---|---|---|
| 2023/0022748 A1* | 1/2023 | Liang | H04L 1/1861 |
| 2023/0199631 A1* | 6/2023 | Van Der Velde | H04W 4/40 |
| | | | 370/328 |
| 2023/0300801 A1* | 9/2023 | Fouad | H04W 72/02 |
| | | | 370/329 |
| 2024/0224354 A1* | 7/2024 | Kang | H04W 72/23 |
| 2024/0292454 A1* | 8/2024 | Kim | H04W 72/40 |
| 2024/0414743 A1* | 12/2024 | Selvanesan | H04W 76/14 |
| 2025/0024505 A1* | 1/2025 | Calcev | H04W 74/0816 |
| 2025/0056600 A1* | 2/2025 | Selvanesan | H04W 28/18 |

* cited by examiner

CO-CHANNEL COEXISTENCE IN DIFFERENT RADIO ACCESS TECHNOLOGIES FOR SIDELINK COMMUNICATION

TECHNICAL FIELD

The technology discussed below relates generally to wireless communication networks, and more particularly, to sharing a sidelink channel between wireless communication devices operating in different radio access technologies.

BACKGROUND

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

Resources in a sidelink network may be reserved in two different modes. In a first mode, e.g., "Mode 1", a base station may allocate resources to UEs for sidelink communication therebetween. In Mode 1, sidelink feedback may be reported between the UEs and further reported back to the base station. In a second mode, e.g., "Mode 2", the UEs may autonomously select sidelink resources for sidelink communication therebetween. In Mode 2, sidelink feedback may be transmitted between the UEs.

BRIEF SUMMARY OF SOME EXAMPLES

The following presents a summary of one or more aspects of the present disclosure in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a wireless communication device configured for wireless communication is disclosed. The wireless communication device includes a transceiver, a memory, and a processor coupled to the transceiver and the memory. The processor is configured to receive at least one resource reservation message using a first radio access technology (RAT). Each of the at least one resource reservation message identifying at least one resource of a plurality of resources of a sidelink channel for a respective sidelink transmission using the first RAT. The processor further being configured to estimate a first channel occupancy of the sidelink channel of a second RAT different than the first RAT based on measurements obtained over a total number of the plurality of resources and the at least one resource reservation message.

Another example provides a method for wireless communication at a wireless communication device. The method includes receiving at least one resource reservation message using a first radio access technology (RAT). Each of the at least one resource reservation message identifying at least one resource of a plurality of resources of a sidelink channel for a respective sidelink transmission using the first RAT. The method further includes estimating a first channel occupancy of the sidelink channel of a second RAT different than the first RAT based on measurements obtained over a total number of the plurality of resources and the at least one resource reservation message.

Another example provides a wireless communication device configured for wireless communication. The wireless communication device includes means for receiving at least one resource reservation message using a first radio access technology (RAT). Each of the at least one resource reservation message identifying at least one resource of a plurality of resources of a sidelink channel for a respective sidelink transmission using the first RAT. The wireless communication device further includes means for estimating a first channel occupancy of the sidelink channel of a second RAT different than the first RAT based on measurements obtained over a total number of the plurality of resources and the at least one resource reservation message.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

DETAILED DESCRIPTION

Figure 1:
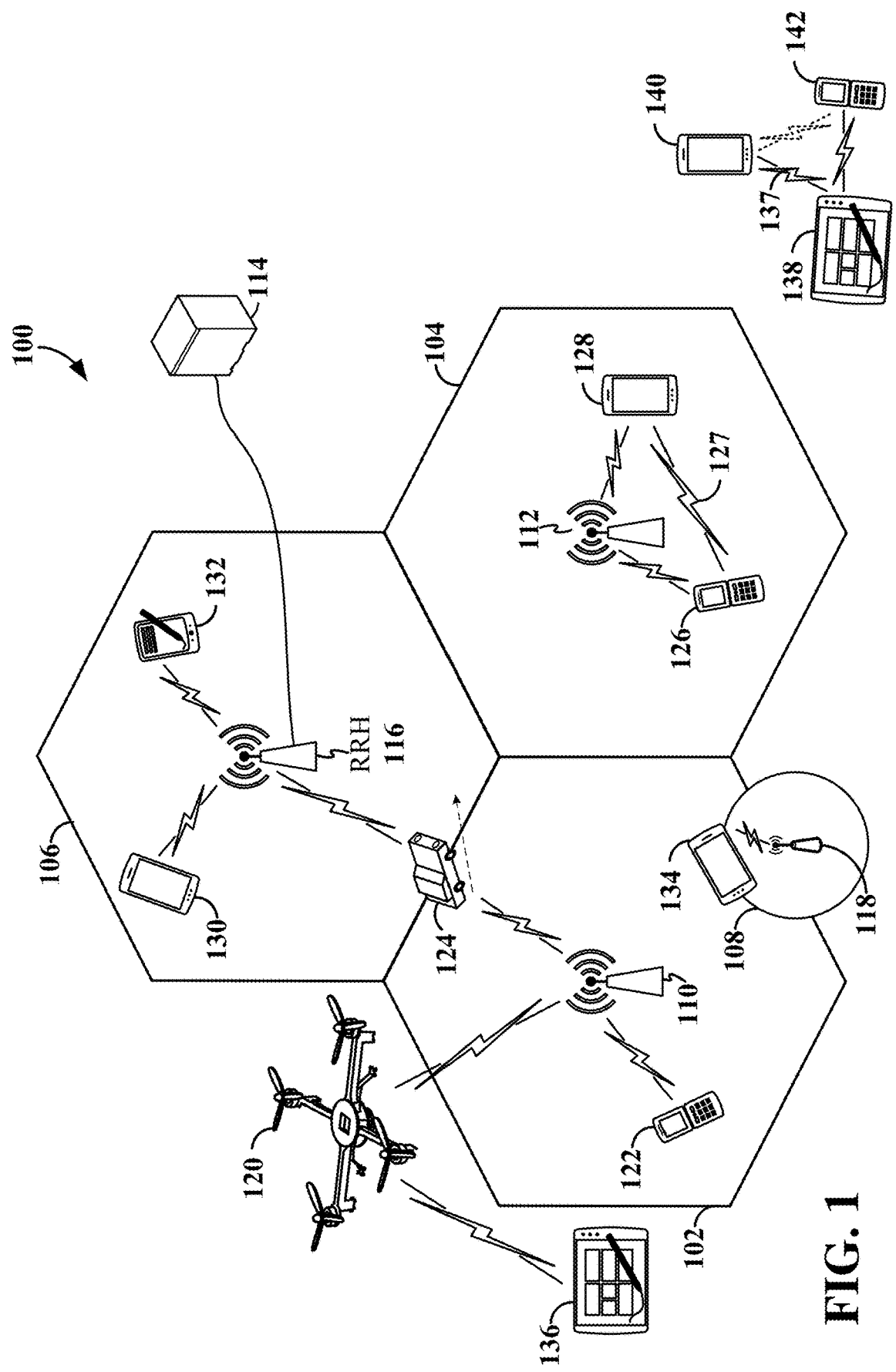
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to mechanisms for enabling co-channel coexistence in different radio access technologies (RATs) for sidelink communication. For example, aspects relate to techniques for supporting coexistence of a 5G New Radio (NR) wireless communication device and one or more 4G Long Term Evolution (LTE) wireless communication devices on the same sidelink channel. A wireless communication device (e.g., a 5G NR sidelink device) may be configured to continuously monitor the sidelink channel to obtain measurements (e.g., reference signal received power (RSSI) measurements) over each of a plurality of resources (e.g., time-frequency resources) of the sidelink channel. The wireless communication device may further be configured to receive and decode each of a plurality of resource reservation messages using a first RAT (e.g., NR sidelink). Based on the measurements and the received and decoded resource reservation messages, the wireless communication device may then be configured to estimate an LTE channel occupancy of the sidelink channel.

In some examples, the wireless communication device may calculate a channel busy ratio (CBR) of the sidelink channel based on the measurements. For example, the wireless communication device may compute the CBR over a time window corresponding to a number of slots. The wireless communication device may then determine a total NR channel occupancy of the sidelink channel within the time window based on successful decoding of each of the received NR resource reservation messages. For example, the resource reservation messages may correspond to first stage sidelink control information (SCI-1) carrying a reservation for a sidelink data transmission and/or reservation information included within SCI-1 for one or more future data transmissions. The LTE channel occupancy of the sidelink channel may then be calculated based on the CBR and the NR channel occupancy. For example, the LTE channel occupancy may be calculated as the difference between the NR channel occupancy and a product of the CBR and a product of the number of slots in the time window and the total number of the plurality of resources of the sidelink channel in the frequency domain per slot.

In other examples, the wireless communication device may calculate an LTE channel busy ratio based on a number of resources on the sidelink channel having an RSSI above a threshold, but for which no NR SCI (e.g., SCI-1) is decodable. The LTE channel occupancy of the sidelink channel may then be calculated based on the total number of resources and the LTE channel busy ratio of the sidelink channel.

The wireless communication device may further identify a set of available resources for NR sidelink data transmission based on the LTE channel occupancy. For example, the wireless communication device may select the set of available resources based on a lookup table or algorithm mapping a plurality of sets of available resources to corresponding respective values of the LTE channel occupancy. The wireless communication device may then transmit a new sidelink transmission within transmission resources selected from the set of available resources.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and UE), end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
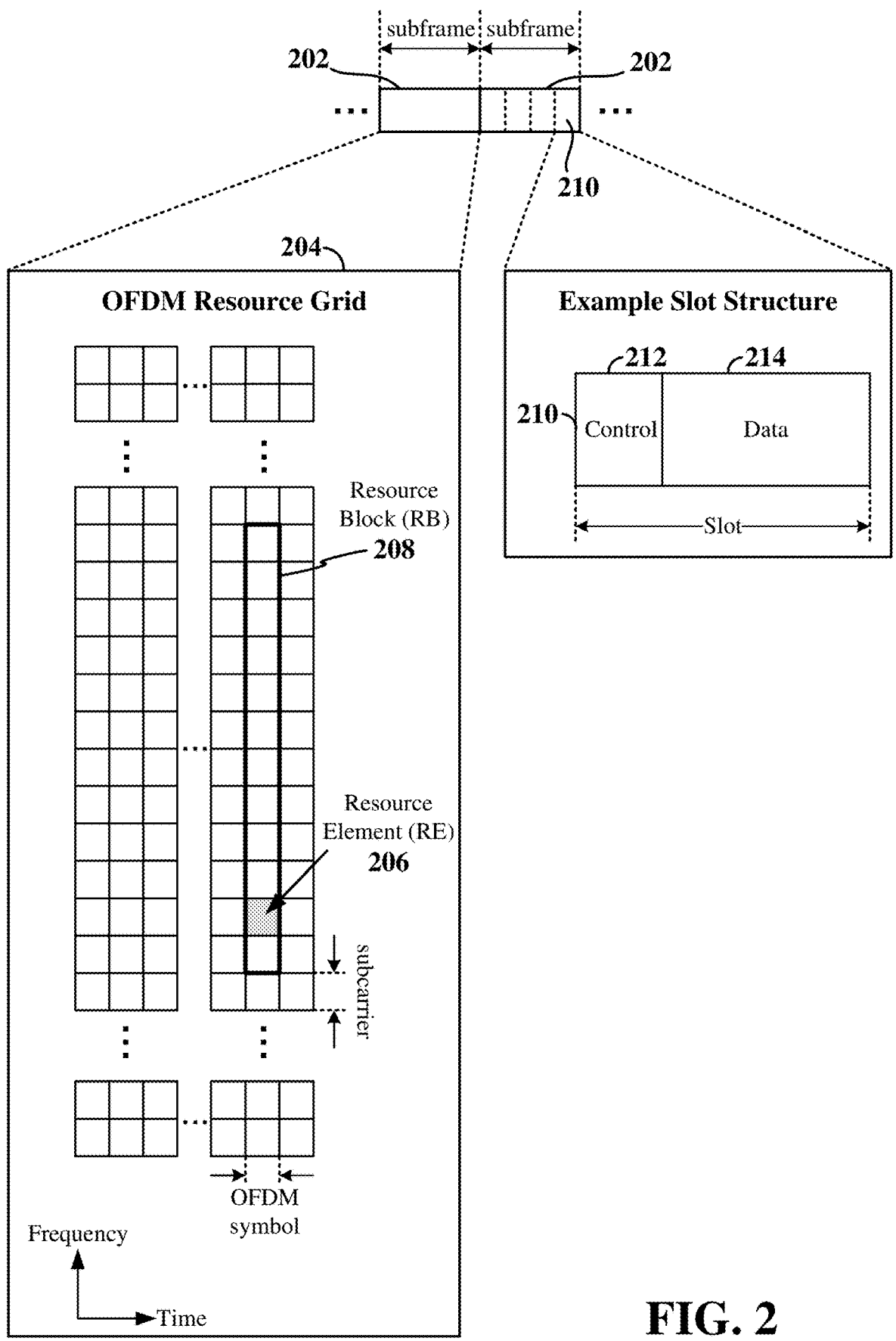
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a network entity (e.g., gNB, eNB, etc., implemented as an aggregated or disaggregated base station) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a network entity, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a network entity) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The network entity may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, a sidelink DMRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
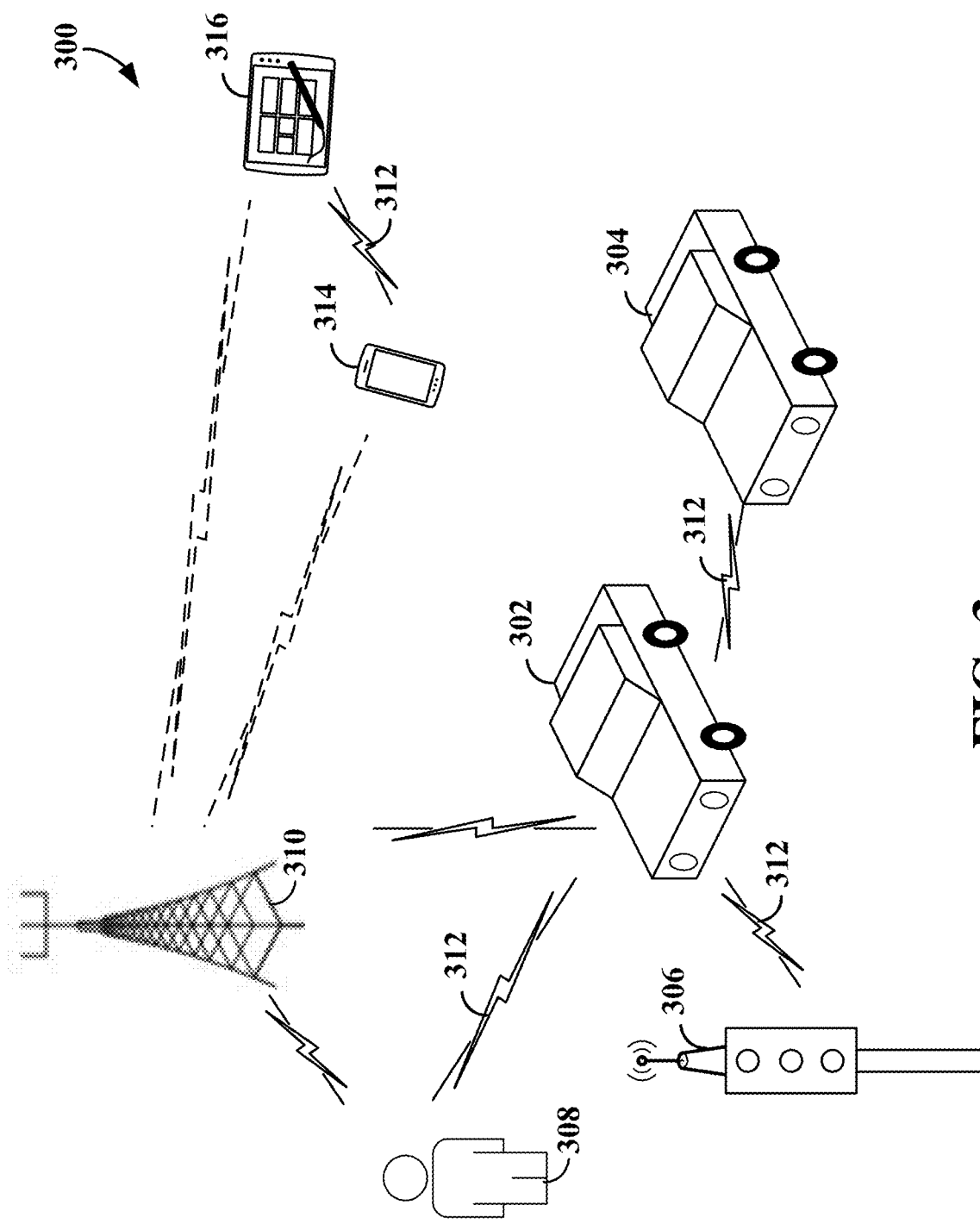
FIG. 3 is a diagram illustrating an example of a wireless communication network employing sidelink communication according to some aspects.

FIG. 3 illustrates an example of a wireless communication network 300 configured to support sidelink communication. In some examples, sidelink communication may include D2D or V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., network entity 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a network entity (e.g., network entity 310), but each are still configured for ProSe communication. Partial coverage refers to a scenario in which some of the UEs (e.g., V-UE 304) are outside of the coverage area of the network entity 310, while other UEs (e.g., V-UE 302 and P-UE 308) are in communication with the network entity 310. In-coverage refers to a scenario in which UEs (e.g., V-UE 302 and P-UE 308) are in communication with the network entity 310 (e.g., gNB, which may be implemented as an aggregated or disaggregated network entity) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

Relaying between UEs may further be achieved using D2D/sidelink technology. For example, a remote UE (e.g., UE 304) may generally connect to a source relay UE (e.g., UE 302) via a layer 3 (L3) connection with no Uu connection with (and no visibility to) the network or via a layer 2 (L2) connection where the remote UE supports Uu access stratum (AS) and non-AS connections (NAS) with the network. When there is no direct connection path (Uu connection) between the remote UE and the network entity (e.g., an L3 connection), the remote UE is connected to the relay UE via a PC5 connection only (e.g., Layer 3 UE-to-NW). In this example, the relay UE may report to the 5G core network (5GC) about the remote UE's presence. In other examples, the remote UE may be visible to the 5GC via a non-3GPP interworking function (N3IWF). When there is a direct connection path between the remote UE and the network entity (e.g., an L2 connection), the remote UE may support the NR Uu AS and NAS connections above the PC5 radio link control (RLC) layer. The NG-RAN (e.g., network entity 310) may control the remote UE's PC5 link via NR radio resource control (RRC) signaling.

In 5G NR sidelink, sidelink communication may utilize transmission or reception resource pools. For example, the minimum resource allocation unit in frequency may be a sub-channel, which may include, for example, 10, 15, 20, 25, 50, 75, or 100 consecutive RBs, and the minimum resource allocation unit in time may be one slot. The number of sub-channels in a resource pool may include between one and twenty-seven. The configuration of the resource pool (RP) utilized between two sidelink devices for communication therebetween may be either pre-configured (e.g., a factory setting on the UE determined, for example, by sidelink standards or specifications) or provided by a network entity (e.g., network entity 310).

In addition, there may be two main resource allocation modes of operation for sidelink (e.g., PC5) communications. In a first mode, Mode 1, a network entity (e.g., gNB) 310 may allocate resources to sidelink devices (e.g., V2X devices or other sidelink devices) for sidelink communication between the sidelink devices in various manners. For example, the network entity 310 may allocate sidelink resources dynamically (e.g., a dynamic grant) to sidelink devices, in response to requests for sidelink resources from the sidelink devices. For example, the network entity 310 may schedule the sidelink communication via DCI 3_0. In some examples, the network entity 310 may schedule the PSCCH/PSSCH within uplink resources indicated in DCI 3_0. The network entity 310 may further activate preconfigured sidelink grants (e.g., configured grants) for sidelink communication among the sidelink devices. In some examples, the network entity 310 may activate a configured grant (CG) via RRC signaling. In Mode 1, sidelink feedback may be reported back to the network entity 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

In some examples, the SCI (e.g., SCI-1 and/or SCI-2) may further include a resource assignment of resources reserved for one or more retransmissions of the sidelink transmission (e.g., the sidelink traffic/data) or for one or more additional (new) sidelink transmissions. Thus, the SCI may include a respective PSSCH resource reservation and assignment for one or more PSSCH transmissions. For example, the SCI may include a reservation message indicating the PSSCH resource reservation for the initial sidelink transmission (initial PSSCH) and one or more additional PSSCH resource reservations for one or more retransmissions of the PSSCH.

Figure 4A:
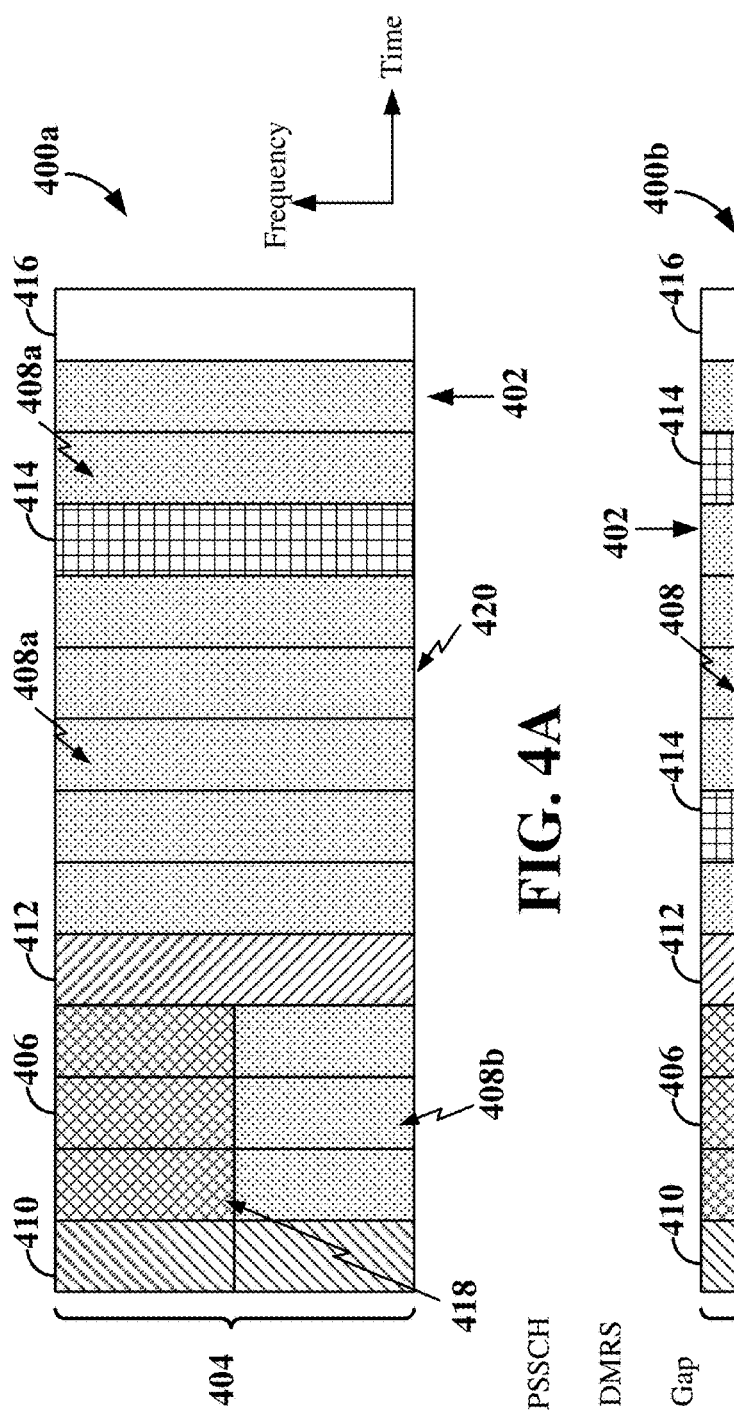
FIGS. 4A and 4B are diagrams illustrating examples of sidelink slot structures according to some aspects.
Figure 4B:
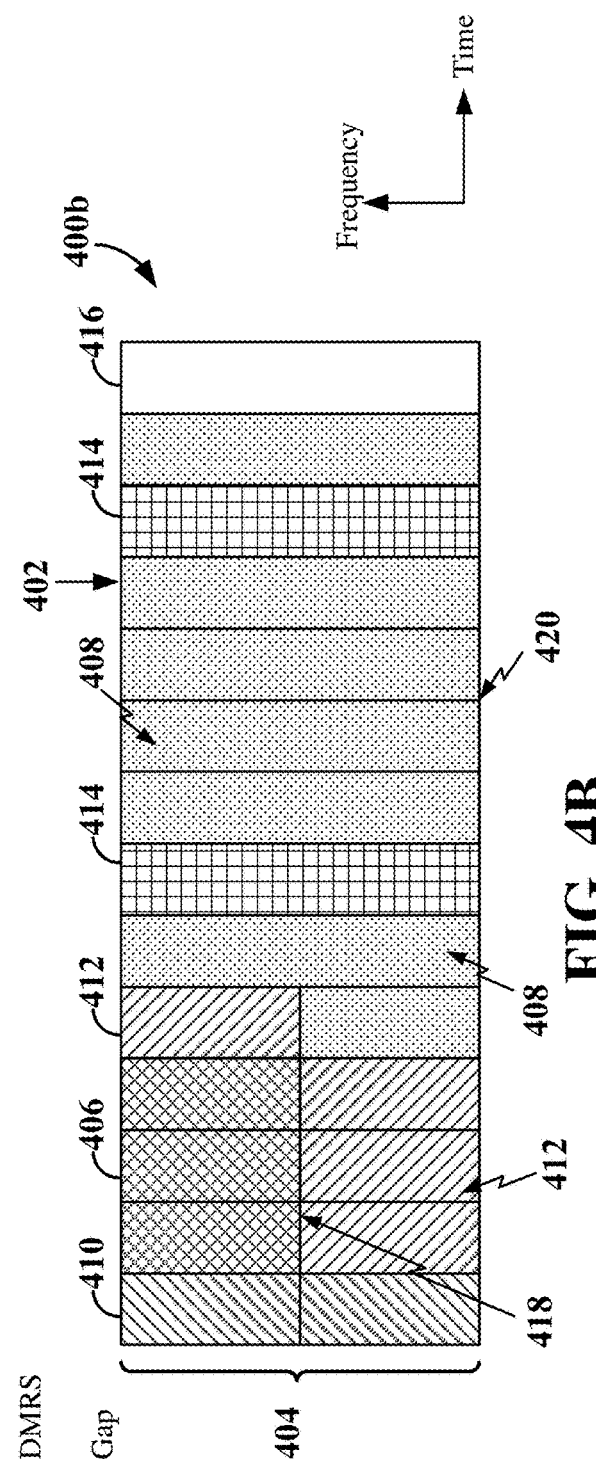

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 15, 20, 25, 50, 75, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 (e.g., SCI format 1-A) that schedules transmission of data traffic (e.g., a packet) on time-frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSCCH resource size may be fixed for a resource pool (e.g., 10% to 100% of one sub-channel in the first two or three symbols). For example, the PSCCH 406 may occupy 10, 12, 15, 20, or 25 RBs of a single sub-channel. In each of the examples shown in FIGS. 4A and 4B, the starting symbol for the PSCCH 406 is the second symbol of the corresponding slot 400a or 400b and the PSCCH 406 spans three symbols 402. The PSCCH 406 may further include DMRSs.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 256-QAM). In addition, the PSSCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In some examples, the DMRSs 414 may be based on a Gold sequence and a configuration type 1 may be used for the frequency domain pattern of the PSSCH DMRSs 414. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408b may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
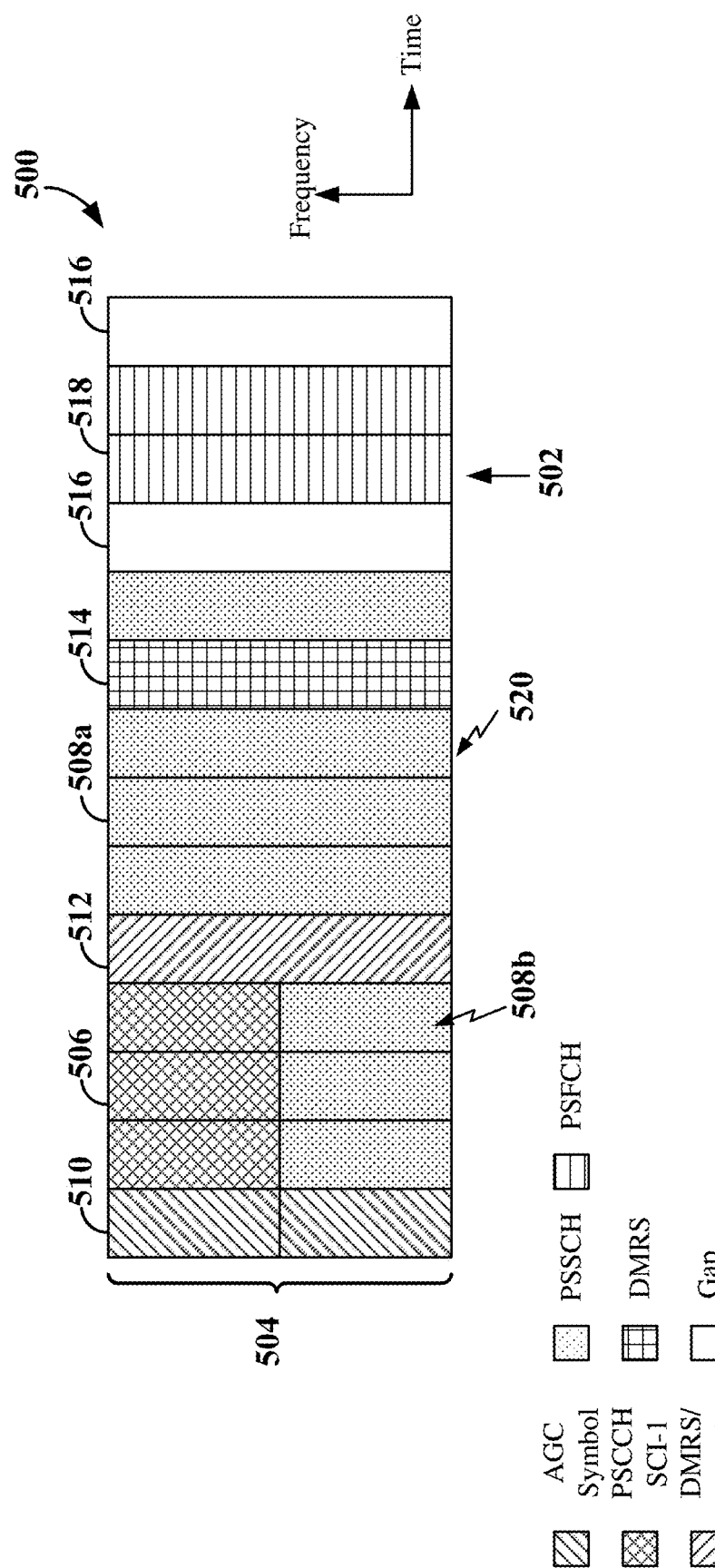
FIG. 5 is a diagram illustrating an example of a sidelink slot structure with feedback resources according to some aspects.

FIG. 5 is a diagram illustrating an example of a sidelink slot structure with feedback resources according to some aspects. The sidelink slot structure may be utilized, for example, in a V2X or other D2D network implementing sidelink. In the example shown in FIG. 5, time is in the horizontal direction with units of symbols 502 (e.g., OFDM symbols); and frequency is in the vertical direction. Here, a carrier bandwidth 504 allocated for sidelink wireless communication is illustrated along the frequency axis. A slot 500 having the slot structure shown in FIG. 5 includes fourteen symbols 502 that may be used for sidelink communication. However, it should be understood that sidelink communication can be configured to occupy fewer than fourteen symbols in a slot 500, and the disclosure is not limited to any particular number of symbols 502.

As in the examples shown in FIGS. 4A and 4B, the sidelink slot 500 includes a PSCCH 506 occupying a control region of the slot 500 and a PSSCH 508 occupying a data region 520 of the slot 500. The PSCCH 506 and PSSCH 508 are each transmitted on one or more symbols 502 of the slot 500. The PSCCH 506 includes, for example, SCI-1 that schedules transmission of data traffic (e.g., a packet) on time-frequency resources of the corresponding PSSCH 508. As shown in FIG. 5, the starting symbol for the PSCCH 506 is the second symbol of the slot 500 and the PSCCH 506 spans three symbols 502. The PSSCH 508 may be time-division multiplexed (TDMed) with the PSCCH 506 and/or frequency-division multiplexed (FDMed) with the PSCCH 506. In the example shown in FIG. 5, the PSSCH 508 includes a first portion 508a that is TDMed with the PSCCH 506 and a second portion 508b that is FDMed with the PSCCH 506.

The PSSCH 508 may further include DMRSs 514 configured in a two, three, or four symbol DMRS pattern. For example, slot 500 shown in FIG. 5 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500. In addition, a gap symbol 516 is present after the PSSCH 508 in the slot 500.

The slot 500 further includes SCI-2 512 mapped to contiguous RBs in the PSSCH 508 starting from the first symbol containing a PSSCH DMRS. In the example shown in FIG. 5, the first symbol containing a PSSCH DMRS is the fifth symbol occurring immediately after the last symbol carrying the PSCCH 506. Therefore, the SCI-2 512 is mapped to RBs within the fifth symbol.

In addition, as shown in FIG. 5, the second symbol of the slot 500 is copied onto (repeated on) a first symbol 510 thereof for automatic gain control (AGC) settling. For example, in FIG. 5, the second symbol containing the PSCCH 506 FDMed with the PSSCH 508b may be transmitted on both the first symbol and the second symbol.

For unicast and/or groupcast transmissions, HARQ feedback may further be transmitted on a physical sidelink feedback channel (PSFCH) 518 in a configurable resource period of 0, 1, 2, or 4 slots. In sidelink slots (e.g., slot 500) containing the PSFCH 518, one symbol 502 may be allocated to the PSFCH 518, and the PSFCH 518 may be copied onto (repeated on) a previous symbol for AGC settling. In the example shown in FIG. 5, the PSFCH 518 is transmitted on the thirteenth symbol and copied onto the twelfth symbol in the slot 500. A gap symbol 516 may further be placed after the PSFCH symbols 518.

In some examples, there is a mapping between the PSSCH 508 and the corresponding PSFCH resource. The mapping may be based on, for example, the starting sub-channel of the PSSCH 508, the slot containing the PSSCH 508, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

Figure 6:
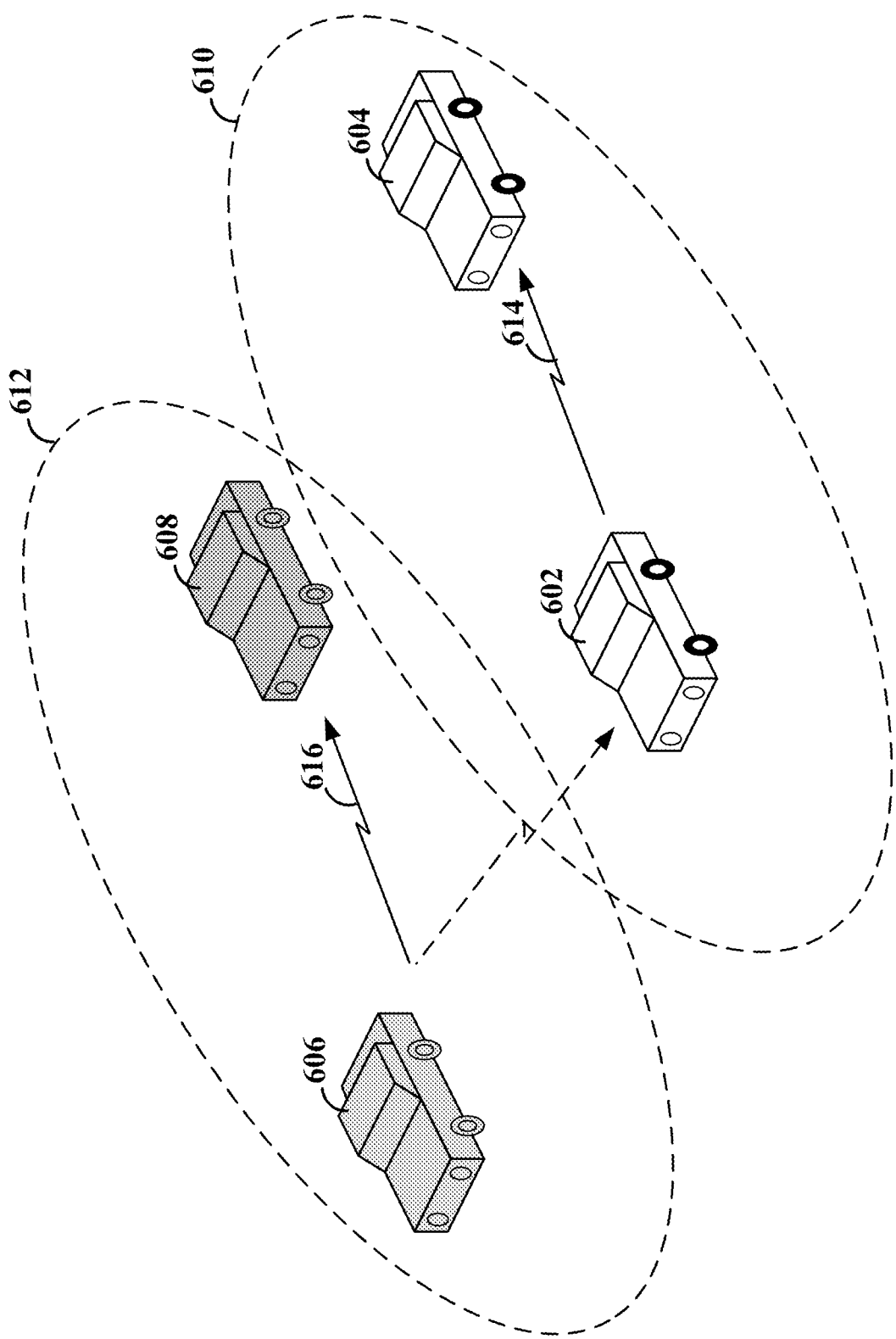
FIG. 6 is a diagram illustrating an example of sidelink channel sharing between different radio access technologies (RATs) according to some aspects.

For Mode 2 sidelink communication, in which wireless communication devices (e.g., UEs or sidelink devices) autonomously schedule sidelink transmissions within a resource pool (RP) of a sidelink channel, both NR sidelink (e.g., NR V2X) and LTE sidelink (e.g., LTE V2X) may operate in the same sidelink channel (e.g., using the same RP) due to scarcity of the spectrum and/or regulatory directives. FIG. 6 is a diagram illustrating an example of sidelink channel sharing between different radio access technologies (RATs) according to some aspects. In the example shown in FIG. 6, wireless communication devices 602, 604, 606, and 608, each of which may correspond to any of the UEs, sidelink devices, or V2X devices shown in FIG. 1, and/or FIG. 3, may all be communicating on the same sidelink channel (e.g., within the same RP). Wireless communication devices 602 and 604 may be communicating on the sidelink channel using a first RAT (e.g., NR sidelink) 610, whereas wireless communication devices 606 and 608 may be communicating on the same sidelink channel using a second RAT (e.g., LTE sidelink) 612.

In the absence of any coordination mechanism between NR sidelink and LTE sidelink, NR sidelink transmissions may collide with LTE sidelink transmissions. For example, wireless communication device 602 may schedule a NR sidelink transmission 614 within the same resource (e.g., same time-frequency resource or sub-channel) as an LTE sidelink transmission 616 scheduled by wireless communication device 606. The LTE sidelink transmission 616 may collide with the NR sidelink transmission 614, thus degrading the performance of each of the NR and LTE sidelink systems.

For co-channel coexistence between NR and LTE sidelink, various techniques may be employed. For example, each wireless communication device 602, 604, 606, and 604 may be a Type A device, a Type B device, or a Type C device. Type A devices include both NR sidelink and LTE sidelink modules, Type B devices include only a NR sidelink module, and Type C devices include only an LTE sidelink module. Thus, wireless communication devices 602 and 604 may be Type A or Type B devices, whereas wireless communication devices 606 and 608 may be Type A or Type C devices.

In a Type A device, the LTE module is able to receive and decode LTE sidelink packets, such as basic safety messages (BSMs) and cooperative awareness messages (CAMs), whereas the NR sidelink module is able to transmit traffic associated with advanced applications, such as sensor sharing, vehicle, and traffic information via PSCCH/PSSCH transmissions. In some examples, an interface may be configured between the LTE sidelink module and the NR sidelink module of a Type A device to enable dynamic resource sharing between the LTE sidelink module and NR sidelink module. For example, the LTE sidelink module may share LTE sidelink resource reservation information with the NR sidelink module to facilitate awareness by the NR sidelink module of resources within the shared RP (e.g., on the shared sidelink channel) reserved by other neighboring LTE sidelink devices. As such, the NR sidelink module may avoid scheduling NR sidelink transmissions within resources utilized by other LTE sidelink devices.

However, for Type B devices or Type A devices that do not support an interface between the LTE module and the NR sidelink module, the NR sidelink module may be unable to decode the LTE control channel, and therefore, the NR sidelink module may not have knowledge of the LTE scheduling assignments on the sidelink channel. Various aspects relate to techniques to support co-channel coexistence between NR sidelink devices and LTE sidelink devices on the same sidelink channel (e.g., within the same RP) in the absence of sensing and resource reservation information in a NR sidelink device from a collocated LTE module.

In some aspects, a wireless communication device (e.g., a 5G NR sidelink device), such as wireless communication device 602 shown in FIG. 6, may be configured to continuously monitor the sidelink channel to obtain measurements (e.g., reference signal received power (RSSI) measurements) over each of a plurality of resources (e.g., time-frequency resources) of the sidelink channel. The wireless communication device may further be configured to receive and decode each of a plurality of resource reservation messages using a first RAT (e.g., NR sidelink). Based on the measurements and the received and decoded resource reservation messages, the wireless communication device may then be configured to estimate an LTE channel occupancy of the sidelink channel. Based on the LTE channel occupancy, the wireless communication device may then identify a set of available resources for NR sidelink transmissions and select one or more resources within the set of available resources for a NR sidelink transmission.

Figure 7:
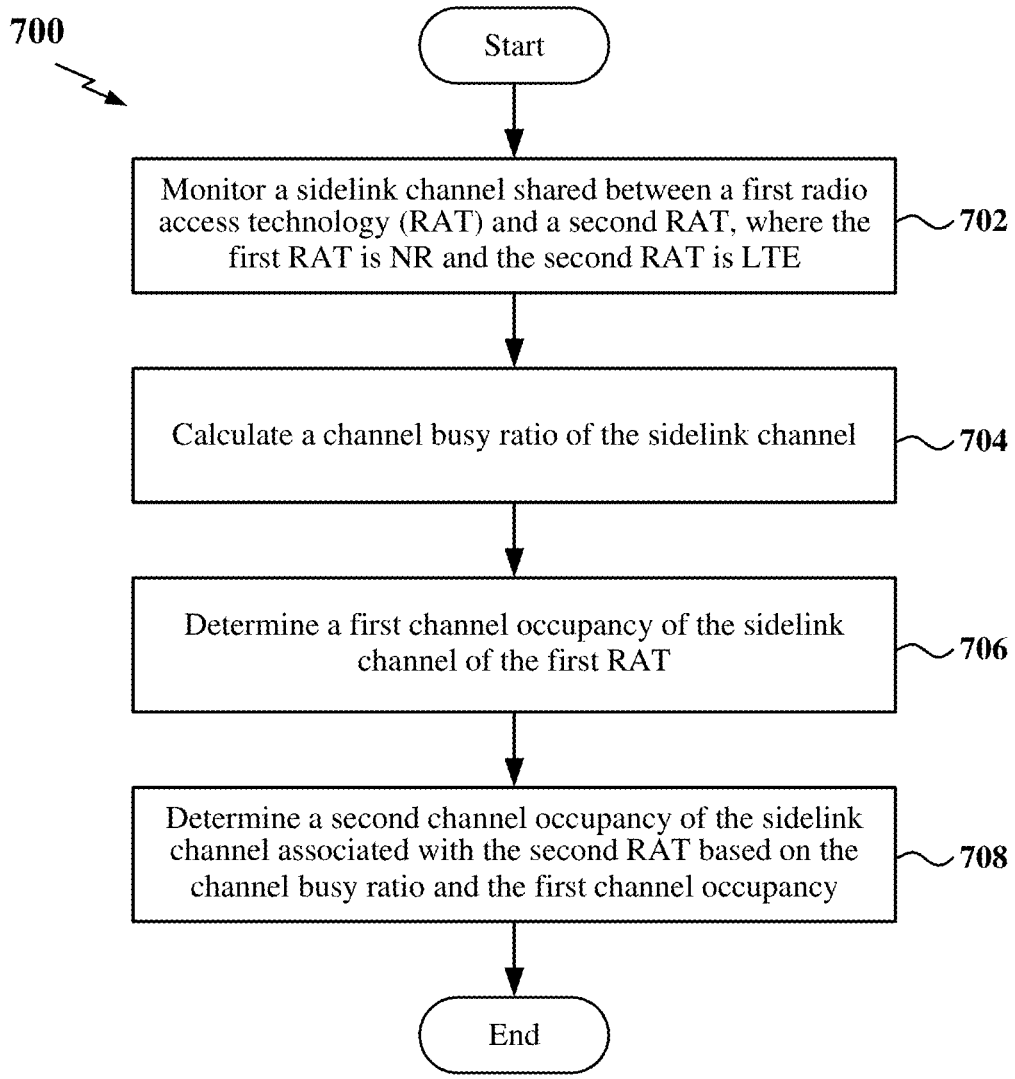
FIG. 7 is a flow chart illustrating an exemplary process for sidelink channel occupancy estimation associated with a RAT different than a supported RAT according to some aspects.

FIG. 7 is a flow chart illustrating an exemplary process 700 for sidelink channel occupancy estimation associated with a RAT different than a supported RAT according to some aspects. As described below, some or all illustrated features may be omitted in a particular implementation within the scope of the present disclosure, and some illustrated features may not be required for implementation of all embodiments. In some examples, the process 700 may be carried out by the wireless communication device 1400 illustrated in FIG. 14. In some examples, the process 700 may be carried out by any suitable apparatus or means for carrying out the functions or algorithm described below.

At block 702, the wireless communication device may monitor a sidelink channel shared between a first radio access technology (RAT) and a second RAT, where the first RAT is NR and the second RAT is LTE. The wireless communication device may be, for example, a NR wireless communication device (e.g., a NR UE). For example, the wireless communication device may be a Type B device or a Type A device that does not provide an internal communication link between an internal NR sidelink module and an internal LTE sidelink module. The sidelink channel may include a plurality of resources (e.g., time-frequency resources, RBs, or sub-channels). In some examples, the wireless communication device may continuously monitor the sidelink channel by sensing over the plurality of resources.

At block 704, the wireless communication device may calculate a channel busy ratio (CBR) of the sidelink channel. For example, the wireless communication device may calculate the CBR over a time window of $T_{win,CBR}$ slots. To calculate the CBR, the wireless communication device may obtain a respective measurement on each of the plurality of resources over the time window. In some examples, the wireless communication device may measure the RSSI on each of the plurality of resources in each of the $T_{win,CBR}$ slots. The wireless communication device may then calculate the CBR as a ratio of a portion of the plurality of resources having an RSSI observed over the time period greater than a threshold.

At block 706, the wireless communication device may determine a first channel occupancy of the sidelink channel associated with the first RAT. For example, the wireless communication device may determine which resources of the plurality of resources are occupied by NR transmissions within the time window. Thus, the first channel occupancy may correspond to a first number of the plurality of resources reserved for sidelink transmissions using the first RAT. In an example, the wireless communication device may receive one or more resource reservation messages using the first RAT. Each of the resource reservation messages may identify at least one of the plurality of resources reserved for a respective sidelink transmission using the first RAT. In some examples, the resource reservation message corresponds to an SCI-1 carried within a NR PSCCH. In other examples, the resource reservation message corresponds to reservation information included within SCI-1. For example, the wireless communication device may determine the first channel occupancy by decoding SCI-1 (e.g., for a current sidelink data (PSSCH) transmission) and/or by estimating the NR channel occupancy by decoding the reservation information (e.g., for one or more future sidelink data (PSSCH) transmissions) in the received SCI-1.

In some examples, the wireless communication device may determine the first channel occupancy by imposing a threshold criteria on the received resource reservation messages (e.g., SCI-1). For example, the wireless communication device may obtain a respective measurement of each of the resource reservation messages. In some examples, the measurements may be reference signal received power (RSRP) or reference signal received quality (RSRQ) measurements of the received resource reservation messages (e.g., SCI-1). The wireless communication device may compare the respective measurement of each of the received resource reservation messages to a threshold. The wireless communication device may then determine the first number of the plurality of resources as the resources associated with resource reservation messages for which the respective measurement is greater than or equal to the threshold. For example, resources reserved in an SCI-1 for a current and/or future sidelink transmission may be included in the first channel occupancy if the SCI-1 is received with $RSRP \geq P_{thresh}$ or $RSRQ \geq R_{thresh}$ where $P_{thresh}$ and $R_{thresh}$ are preconfigured thresholds.

At block 708, the wireless communication device may determine a second channel occupancy of the sidelink channel associated with the second RAT based on the channel busy ratio and the first channel occupancy. For example, the wireless communication device may calculate an occupied amount of the plurality of resources. The occupied amount of the plurality of resources may be based on the CBR, the number of slots within the time window ($T_{win,CBR}$), and the total number of the plurality of resources in the frequency domain ($N_{RB}^{max}$). For example, the occupied amount of the plurality of resources ($R_{occ}$) may be calculated as:

$$R_{occ} = CBR \times (T_{win,CBR} \times N_{RB}^{max}). \quad \text{(Equation 1)}$$

The wireless communication device may then calculate the second channel occupancy (LTE channel occupancy) in the time window $T_{win,CBR}$ based on the occupied amount of the plurality of resources ($R_{occ}$) and the first channel occupancy (Total NR Reservation) as follows:

$$\text{LTE channel occupancy} = R_{occ} - \text{Total NR Reservation.} \quad \text{(Equation 2)}$$

The LTE channel occupancy may indicate, for example, a percentage of the total number of the plurality of resources associated with LTE sidelink transmissions.

In some examples, the wireless communication device may average or filter multiple LTE channel occupancies over multiple time windows (multiple $T_{win,CBR}$). For example, the wireless communication device may average two or more LTE channel occupancies, each associated with a respective time window to obtain the second channel occupancy. In this example, the two or more LTE channel occupancies may be based on a preconfigured or predetermined number of time windows or number of measurement opportunities ($N_{meas,opp}$).

Figure 8:
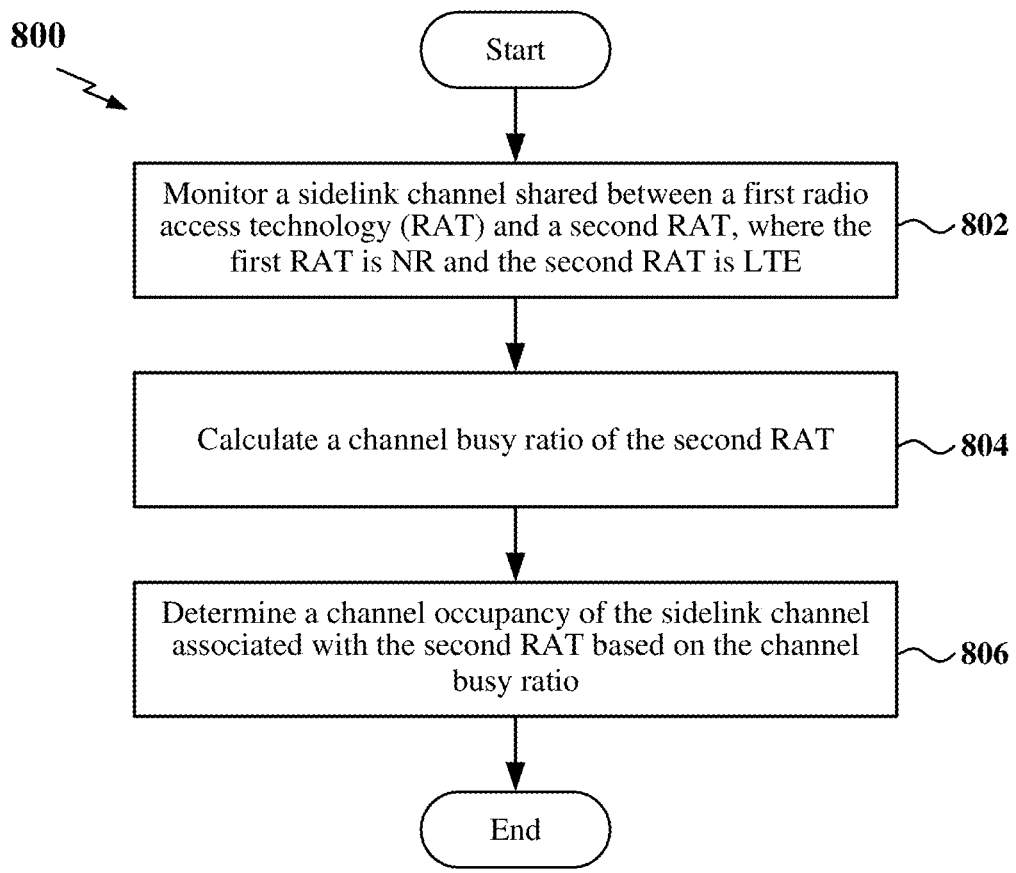
FIG. 8 is a flow chart illustrating another exemplary process for sidelink channel occupancy estimation associated with a RAT different than a supported RAT according to some aspects.

FIG. 8 is a flow chart illustrating another exemplary process 800 for sidelink channel occupancy estimation associated with a RAT different than a supported RAT according to some aspects. As described below, some or all illustrated features may be omitted in a particular implementation within the scope of the present disclosure, and some illustrated features may not be required for implementation of all embodiments. In some examples, the process 800 may be carried out by the wireless communication device 1400 illustrated in FIG. 14. In some examples, the process 800 may be carried out by any suitable apparatus or means for carrying out the functions or algorithm described below.

At block 802, the wireless communication device may monitor a sidelink channel shared between a first radio access technology (RAT) and a second RAT, where the first RAT is NR and the second RAT is LTE. The wireless communication device may be, for example, a NR wireless communication device (e.g., a NR UE). For example, the wireless communication device may be a Type B device or a Type A device that does not provide an internal communication link between an internal NR sidelink module and an internal LTE sidelink module. The sidelink channel may include a plurality of resources (e.g., time-frequency resources, RBs, or sub-channels). In some examples, the wireless communication device may continuously monitor the sidelink channel by sensing over the plurality of resources.

At block 804, the wireless communication device may calculate a channel busy ratio of the second RAT. For example, the wireless communication device may receive one or more resource reservation messages using the first RAT. The wireless communication device may further obtain a respective measurement on each of the plurality of resources over a time window of $T_{win,CBR}$ Slots. In some examples, the wireless communication device may measure the RSSI on each of the plurality of resources in each of the $T_{win,CBR}$ slots.

The wireless communication device may then compare the respective measurement of each of the resources over the time window to a threshold. The wireless communication device may determine a first number of the plurality of resources as those resources having a respective measurement (e.g., RSSI) greater than or equal to the threshold ($RSSI \geq SI_{thresh}$) and within which no resource reservation message is received (e.g., resource reservation messages are absent) over the time window. For example, a resource may be included in the first number of the plurality of resources if no NR SCI-1 is decodable in the respective resource over the time window. Thus, the wireless communication device may calculate the CBR of the second RAT (LTE CBR) as a ratio of the first number of the plurality of resources having an RSSI observed over the time period greater than a threshold and for which no decodable resource reservation message is received.

At block 806, the wireless communication device may determine a channel occupancy of the sidelink channel associated with the second RAT (LTE channel occupancy) based on the channel busy ratio of the second RAT. For example, the wireless communication device may calculate the channel occupancy associated with the second RAT as a ratio of the total number of the plurality of resources in the time window to the first number of the plurality of resources (e.g., the LTE resources). The LTE channel occupancy may indicate, for example, a percentage of the total number of the plurality of resources associated with LTE sidelink transmissions.

In some examples, the wireless communication device may average or filter multiple LTE channel occupancies over multiple time windows (multiple $T_{win,CBR}$). For example, the wireless communication device may average two or more LTE channel occupancies, each associated with a respective time window to obtain the second channel occupancy. In this example, the two or more LTE channel occupancies may be based on a preconfigured or predetermined number of time windows or number of measurement opportunities ($N_{meas,opp}$).

Figure 9:
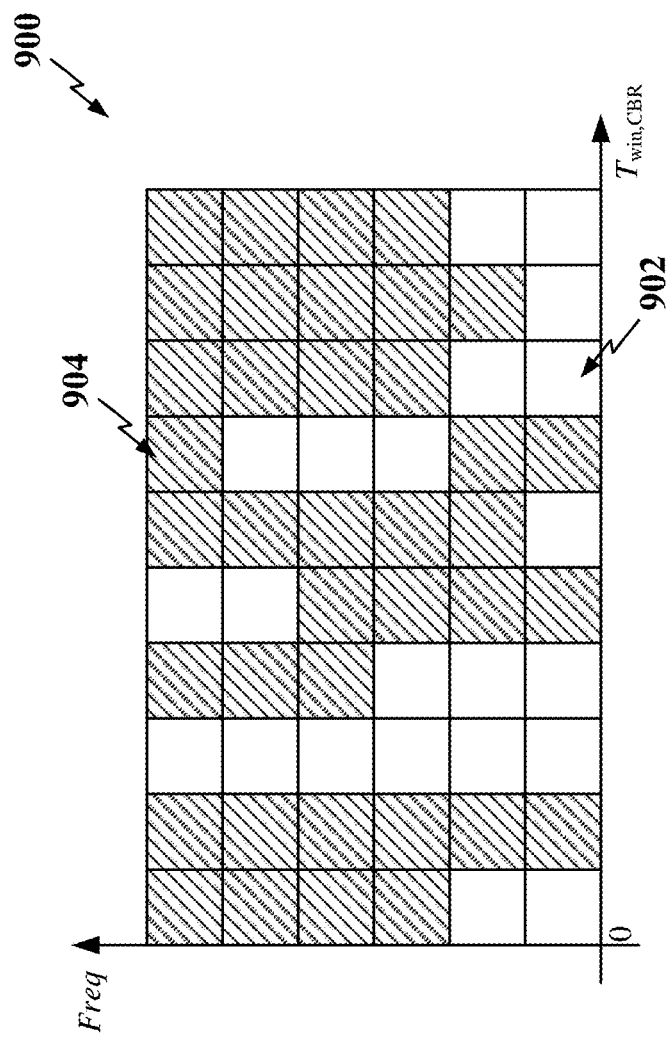
FIG. 9 is a diagram illustrating an example of a resource pool of a sidelink channel according to some aspects.

FIG. 9 is a diagram illustrating an example of a resource pool 900 of a sidelink channel according to some aspects. The resource pool 900 includes a plurality of resources 902 (e.g., time-frequency resources). Each resource 902 may correspond, for example, to an RB or a sub-channel. In examples in which each resource 902 corresponds to an RB, each resource 902 may further correspond to a symbol in the time domain and to a suitable number of subcarriers (e.g., twelve subcarriers) in the frequency domain. In examples in which each resource 902 corresponds to a sub-channel, each resource 902 may further correspond to a slot in the time domain and to 10, 15, 20, 25, 50, 75, or 100 resource blocks in the frequency domain.

A wireless communication device (e.g., UE, V2X, or other suitable sidelink device) may be configured to sense the sidelink channel and measure a respective RSSI associated with each of the plurality of resources 902 over a time window ($T_{win,CBR}$). In addition, the wireless communication device may further be configured to compare the respective measured RSSI (averaged over the time period) to a threshold. FIG. 9 further illustrates busy resources 904 having a respective RSSI greater than the threshold (RSSI>Thresh). The channel busy ratio over the time window (e.g., an occupied amount of resources) for the resource pool 900 may then be ascertained as a ratio of the number of busy resources 904 of the resource pool 900 of the sidelink channel.

Figure 10:
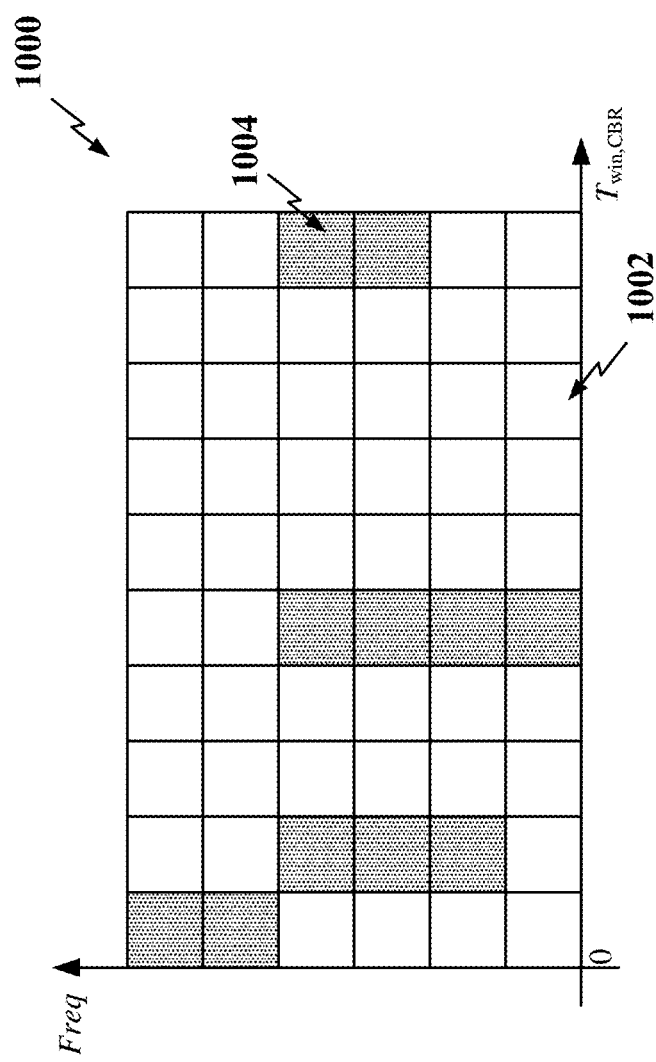
FIG. 10 is a diagram illustrating another example of a resource pool of a sidelink channel according to some aspects.

FIG. 10 is a diagram illustrating another example of a resource pool 1000 of a sidelink channel according to some aspects. As in the example shown in FIG. 9, the resource pool 1000 includes a plurality of resources 1002 (e.g., time-frequency resources). In some examples, a wireless communication device may be configured to determine a NR channel occupancy of the sidelink channel (e.g., a Total NR Reservation) over a time window ($T_{win,CBR}$). For example, the wireless communication device may be configured to identify NR resources 1004 among the plurality of resources 1002 of the sidelink channel based on decoding of NR resource reservation messages (e.g., SCI-1 or reservation information within SCI-1). Thus, each of the NR resources 1004 are associated with a NR resource reservation message (e.g., SCI reservation) decoded by the wireless communication device.

Figure 11:
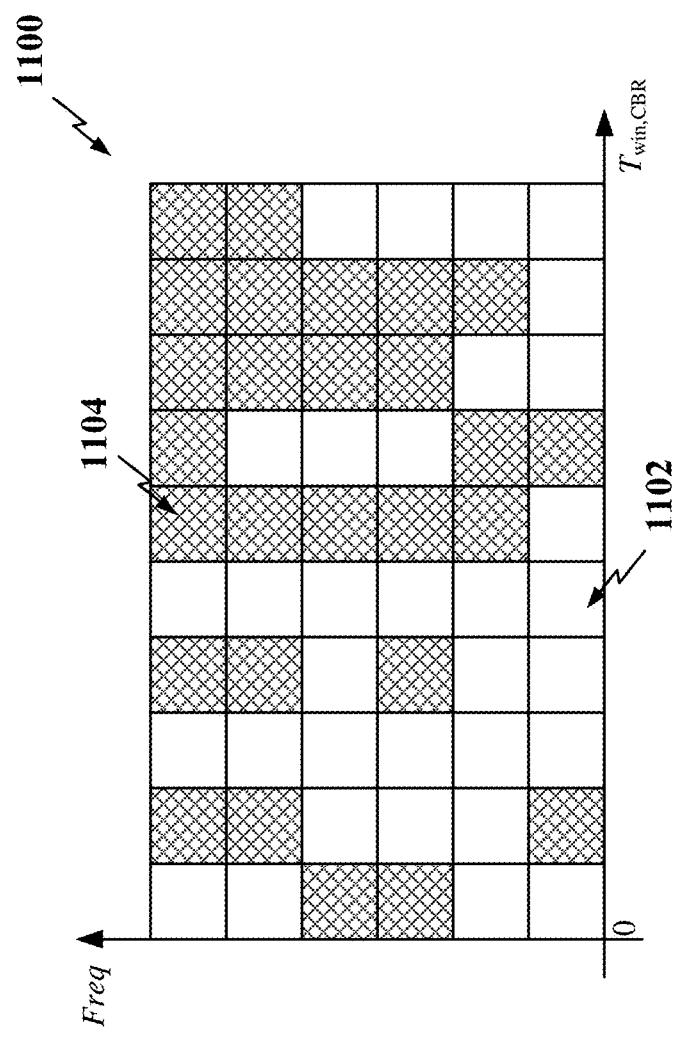
FIG. 11 is a diagram illustrating another example of a resource pool of a sidelink channel according to some aspects.

FIG. 11 is a diagram illustrating another example of a resource pool 1100 of a sidelink channel according to some aspects. As in the examples shown in FIGS. 9 and 10, the resource pool 1100 includes a plurality of resources 1102 (e.g., time-frequency resources). FIG. 11 further illustrates LTE resources 1104 reserved by wireless communication devices operating over LTE. A wireless communication device may identify the LTE resources 1104 by comparing the busy resources (e.g., the CBR) shown in FIG. 9 with the NR resources 1004 (e.g., the NR channel occupancy) shown in FIG. 10. For example, each busy resource 904, as shown in FIG. 9, that is not a NR resource, as shown in FIG. 10, may be considered to be an LTE resource 1104. Thus, based on the difference between the CBR over the time window ($T_{win,CBR}$) shown in FIG. 9 and the NR channel occupancy over the time window shown in FIG. 10, the wireless communication device may determine the LTE channel occupancy.

In some examples, the wireless communication device may directly discern the LTE resources 1104 based on the measured RSSI on a resource being above a threshold and an absence of a NR SCI or NR reservation for that resource. In this example, the wireless communication device may ascertain the LTE CBR (e.g., based on the LTE resources 1104) and then determine the LTE channel occupancy based on the LTE CBR.

Figure 12:
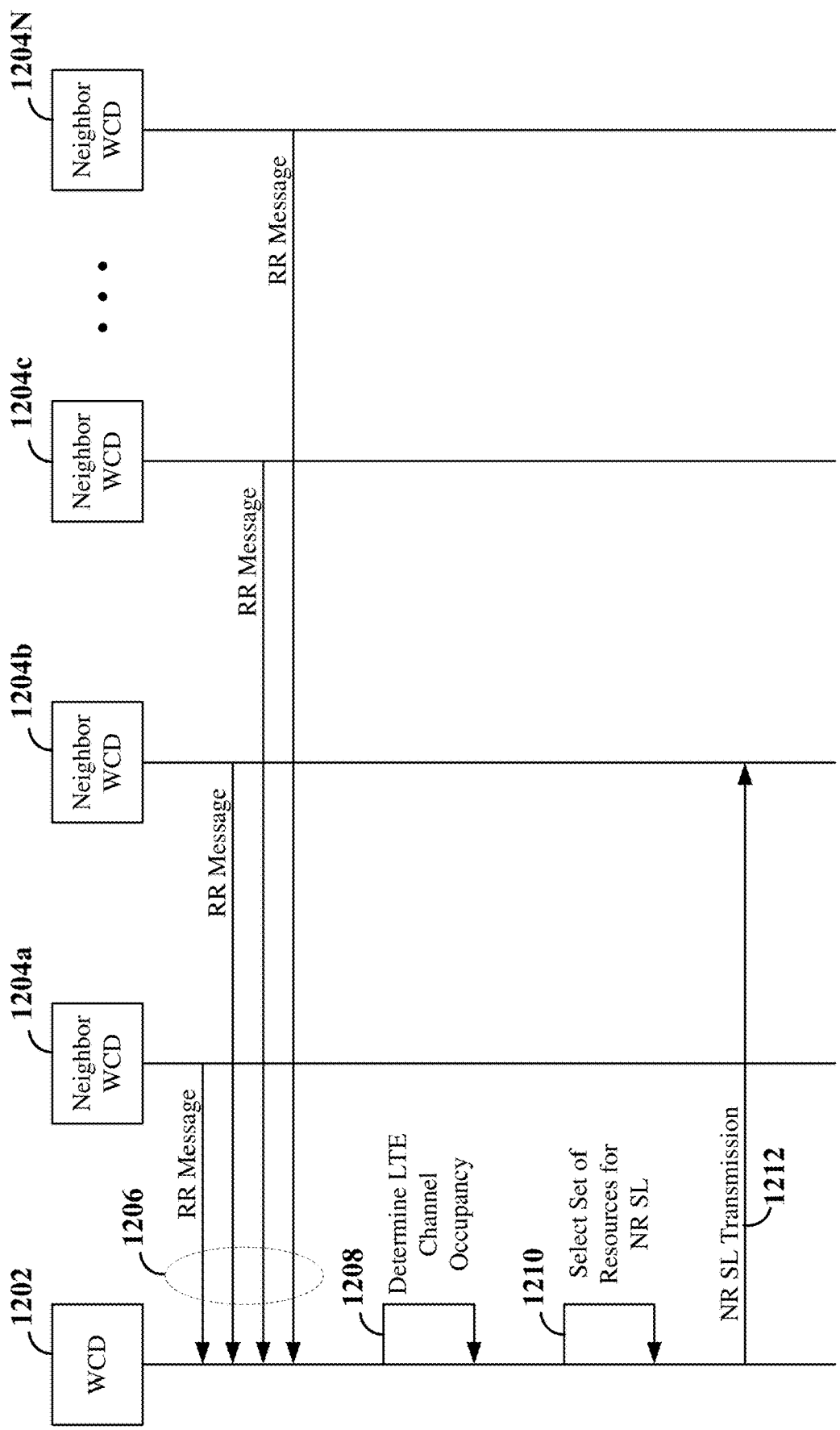
FIG. 12 is a diagram illustrating exemplary signaling on a sidelink channel shared between different RATs according to some aspects.

FIG. 12 is a diagram illustrating exemplary signaling on a sidelink channel shared between different RATs according to some aspects. For example, the sidelink channel (e.g., resource pool) may be shared between a first wireless communication device (WCD) 1202 and a plurality of other neighbor wireless communication devices (WCDs) 1204a, 1204b, 1204c, ..., 1204N within range of the first wireless communication device 1202. Each of the wireless communication devices 1202 and 1204a ... 1204N may correspond to any of the UEs, sidelink devices, or V2X devices shown in FIGS. 1, 3, and/or 6. The first wireless communication device 1202 may be communicating on the sidelink channel using, for example, a first RAT (e.g., NR sidelink). For example, the first wireless communication device may be a Type B device or a Type A device that does not include an interface between LTE and NR sidelink modules. Neighbor wireless communication devices 1204a ... 1204N may be communicating on the same sidelink channel using at least one of the first RAT or a second RAT (e.g., LTE sidelink).

At 1206, the first wireless communication device 1202 may receive a plurality of resource reservation messages from the plurality of other neighbor wireless communication devices 1204a ... 1204N. In some examples, the resource reservation messages may be NR resource reservation messages decodable by the first wireless communication device 1202.

At 1208, the first wireless communication device 1202 may determine the LTE channel occupancy of the sidelink channel. For example, the first wireless communication device 1202 may sense the sidelink channel to obtain a respective measurement (e.g., RSSI) over a time window of each resource of a plurality of resources associated with the sidelink channel. The first wireless communication device 1202 may then determine the LTE channel occupancy based on the received resource reservation messages and the resource measurements. For example, as shown and described above in connection with FIG. 7, the first wireless communication device 1202 may calculate a CBR of the sidelink channel over the time window, determine a NR channel occupancy based on the received resource reservation messages, and calculate the LTE channel occupancy based on the CBR and the NR channel occupancy. As another example, as shown and described above in connection with FIG. 8, the first wireless communication device 1202 may calculate an LTE CBR based on the measurements and the received resource reservation messages and determine the LTE channel occupancy based on the LTE CBR.

At 1210, the first wireless communication device 1202 may select a set of available resources for a new NR sidelink transmission based on the LTE channel occupancy. For example, the first wireless communication device 1202 may identify the set of available resources from a plurality of sets of available resources. In this example, each set of available resources may be associated with a respective value of the LTE channel occupancy. For example, the first wireless communication device 1202 may maintain a lookup table mapping LTE channel occupancies to respective sets of available resources. As another example, the mapping between LTE channel occupancies and respective sets of available resources may be based on an algorithm stored on the first wireless communication device 1202. The lookup table and/or algorithm may be preconfigured on the first wireless communication device 1202 (e.g., by the original equipment manufacturer (OEM) based on one or more standards or specifications) or may be received by the first wireless communication device 1202 from another wireless communication device and/or a network entity (e.g., base station, core network node, etc.) of a wireless communication network. In some examples, the set of available resources may repeat with a known periodicity (e.g., 20 ms, 100 ms, etc.) of available resources. For example, the periodicity may be preconfigured on the first wireless communication device 1202 or received from another wireless communication device and/or network entity.

At 1212, the first wireless communication device 1202 may transmit a NR sidelink (SL) transmission on the sidelink channel within transmission resources selected from the set of available resources. In some examples, the NR SL transmission may include, for example, a PSCCH containing SCI scheduling a PSSCH, along with a PSSCH containing sidelink data. For example, the NR SL transmission may be a unicast SL transmission sent to neighbor wireless communication device 1204b. In other examples, the NR SL transmission may be a broadcast or groupcast NR SL transmission sent to multiple neighbor wireless communication devices (e.g., neighbor wireless communication devices 1204*a* . . . 1204N).

In other examples, the NR SL transmission may be a sidelink coordination message (e.g., an inter-UE coordination message) that may be transmitted, for example, as a unicast, broadcast, or groupcast message. The sidelink coordination message may include, for example, sidelink assistance information to assist one or more of the neighbor wireless communication devices 1204*a* . . . 1204N in receiving and/or scheduling sidelink transmissions on the sidelink channel. In some examples, the sidelink coordination message may indicate the set of available resources are preferred resources for NR sidelink transmissions on the sidelink channel. In other examples, the sidelink coordination message may indicate other resources outside the set of available resources are non-preferred resources for NR sidelink transmissions.

Figure 13:
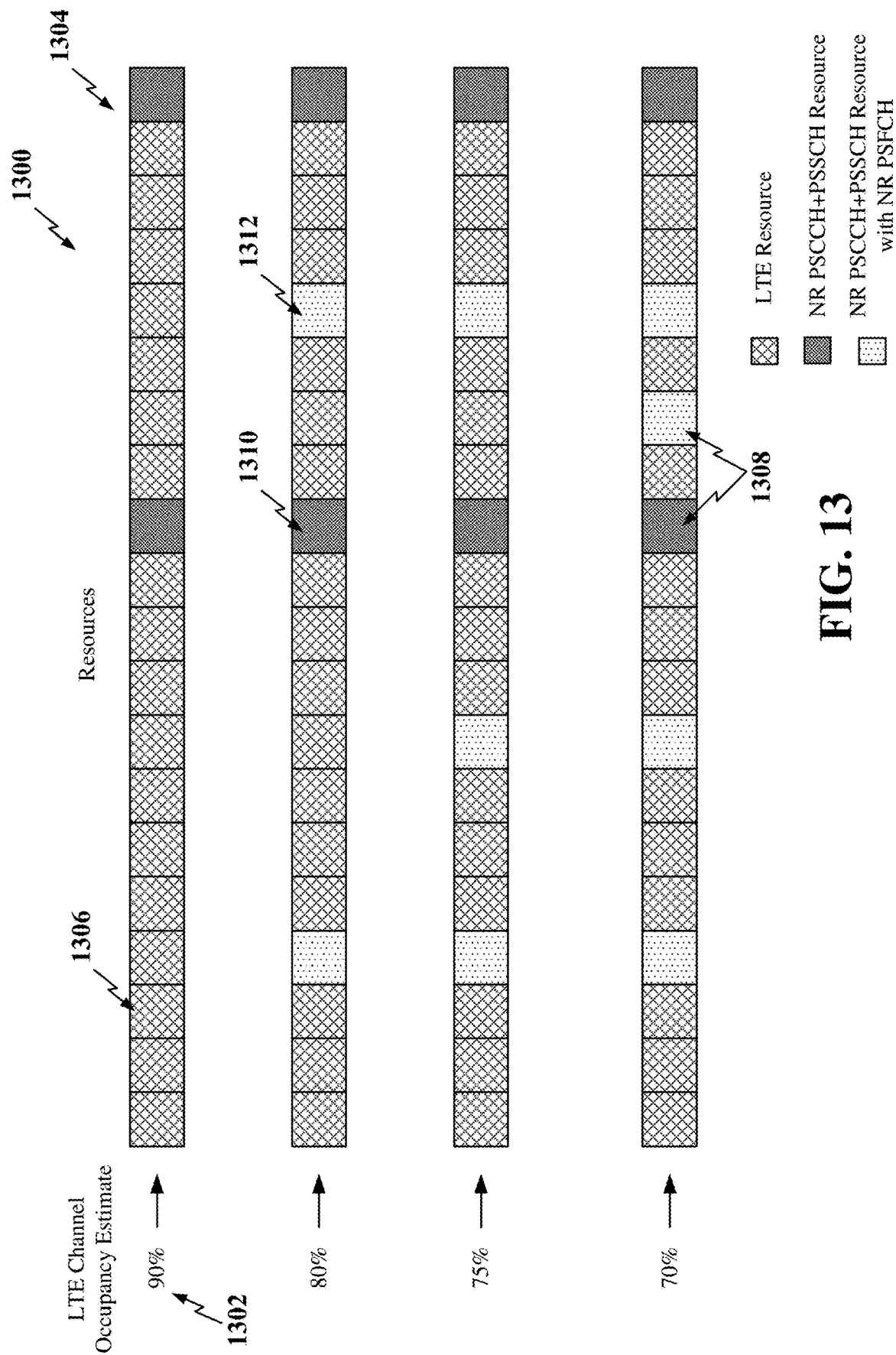
FIG. 13 is a diagram illustrating an exemplary mapping between LTE channel occupancies and sidelink channel resources according to some aspects.

FIG. 13 is a diagram illustrating an exemplary mapping between LTE channel occupancies and sidelink channel resources according to some aspects. In FIG. 13, an exemplary lookup table 1300 is provided including LTE channel occupancies 1302 and associated resources 1304. For each LTE occupancy 1302, the resources 1304 include a respective set of LTE resources 1306 and a respective set of available NR resources 1308. Each set of available NR resources 1308 may include, for example, one or more first resources 1310 configured to include sidelink control information (e.g., PSCCH carrying SCI) and sidelink data (e.g., PSSCH). Thus, the first resources 1310 may be considered to be NR PSCCH+PSSCH resources. In addition, each set of available NR resources 1308 may further include one or more second resources 1312 configured to further include sidelink feedback information (e.g., PSFCH). Thus, the second resources 1312 may be considered to be NR PSCCH+PSSCH with PSFCH resources. The number of available NR resources within each set of available NR resources 1308 may vary based on the LTE channel occupancy. For example, the number of available NR resources within the set of available NR resources 1308 may increase as the LTE channel occupancy decreases.

Figure 14:
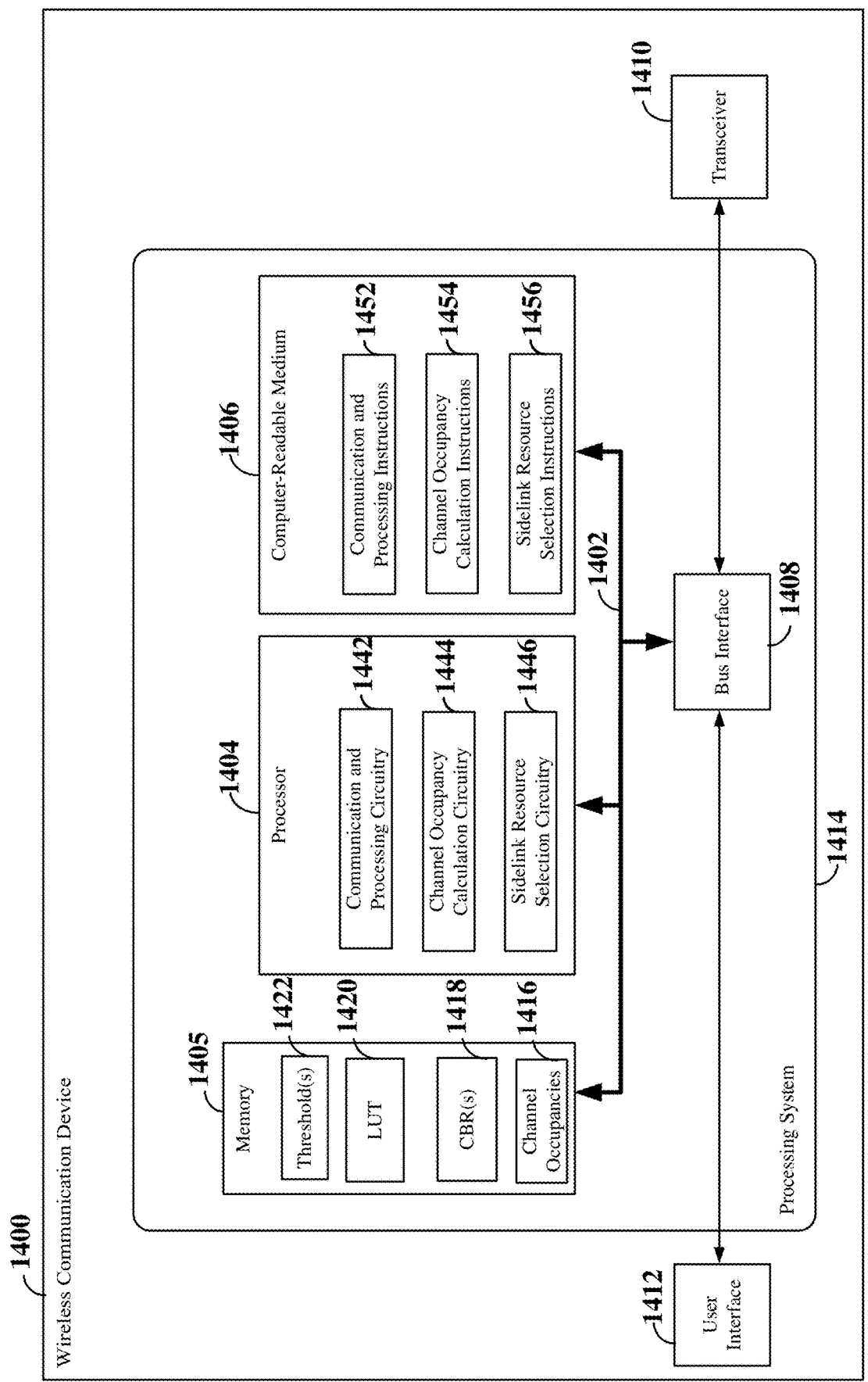
FIG. 14 is a block diagram illustrating an example of a hardware implementation for a wireless communication device employing a processing system according to some aspects.

FIG. 14 is a block diagram illustrating an example of a hardware implementation for a wireless communication device 1400 employing a processing system 1414. For example, the wireless communication device 1400 may correspond to a sidelink device, such as a V2X device, D2D device or other UE or wireless communication device configured for sidelink communication, as shown and described above in reference to FIGS. 1, 3, 6, and/or 12.

The wireless communication device 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1400 may be configured to perform any one or more of the functions described herein. That is, the processor 1404, as utilized in the wireless communication device 1400, may be used to implement any one or more of the processes and procedures described below.

The processor 1404 may in some instances be implemented via a baseband or modem chip and in other implementations, the processor 1404 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 links together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further.

A bus interface 1408 provides an interface between the bus 1402 and a transceiver 1410. The transceiver 1410 provides a communication interface or a means for communicating with various other apparatus over a transmission medium (e.g., air interface). Depending upon the nature of the apparatus, a user interface 1412 (e.g., keypad, display, touch screen, speaker, microphone, control knobs, etc.) may also be provided. Of course, such a user interface 1412 is optional, and may be omitted in some examples.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software. For example, the memory 1405 may store one or more of channel occupancies 1416 (e.g., a NR and/or LTE channel occupancy), channel busy ratio(s) (CBR(s)) 1418 (e.g., a CBR of the sidelink channel and/or an LTE CBR), a lookup table (LUT) 1420, and/or one or more threshold(s) 1422, which may be used by the processor 1404 in generating and processing sidelink transmissions.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406.

The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. In some examples, the computer-readable medium 1406 may be part of the memory 1405. Those skilled in the art will recognize how best to implement the described functionality presented throughout this disclosure depending on the particular application and the overall design constraints imposed on the overall system. In some examples, the computer-readable medium 1406 may be implemented on an article of manufacture, which may further include one or more other elements or circuits, such as the processor 1404 and/or memory 1405.

In some aspects of the disclosure, the processor 1404 may include circuitry configured for various functions. For example, the processor 1404 may include communication and processing circuitry 1442, configured to communicate with one or more sidelink devices (e.g., other wireless communication devices) via respective sidelinks (e.g., PC5 interfaces). In addition, the communication and processing circuitry 1442 may be configured to communicate with a network entity (e.g., a base station, such as a gNB or eNB) via a Uu link. In some examples, the communication and processing circuitry 1442 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1442 may include one or more transmit/receive chains.

In some implementations where the communication involves receiving information, the communication and processing circuitry 1442 may obtain information from a component of the wireless communication device 1400 (e.g., from the transceiver 1410 that receives the information via radio frequency signaling or some other type of signaling suitable for the applicable communication medium), process (e.g., decode) the information, and output the processed information. For example, the communication and processing circuitry 1442 may output the information to another component of the processor 1404, to the memory 1405, or to the bus interface 1408. In some examples, the communication and processing circuitry 1442 may receive one or more of signals, messages, other information, or any combination thereof. In some examples, the communication and processing circuitry 1442 may receive information via one or more channels. In some examples, the communication and processing circuitry 1442 may include functionality for a means for receiving. In some examples, the communication and processing circuitry 1442 may include functionality for a means for processing, including a means for demodulating, a means for decoding, etc.

In some implementations where the communication involves sending (e.g., transmitting) information, the communication and processing circuitry 1442 may obtain information (e.g., from another component of the processor 1404, the memory 1405, or the bus interface 1408), process (e.g., modulate, encode, etc.) the information, and output the processed information. For example, the communication and processing circuitry 1442 may output the information to the transceiver 1410 (e.g., that transmits the information via radio frequency signaling or some other type of signaling suitable for the applicable communication medium). In some examples, the communication and processing circuitry 1442 may send one or more of signals, messages, other information, or any combination thereof. In some examples, the communication and processing circuitry 1442 may send information via one or more channels. In some examples, the communication and processing circuitry 1442 may include functionality for a means for sending (e.g., a means for transmitting). In some examples, the communication and processing circuitry 1442 may include functionality for a means for generating, including a means for modulating, a means for encoding, etc.

In some examples, the communication and processing circuitry 1442 may be configured to receive, via the transceiver 1410, at least one resource reservation message using a first radio access technology (RAT), such as NR sidelink. Each resource reservation message can identify at least one resource of a plurality of resources of a sidelink channel for a respective sidelink transmission using the first RAT. In some examples, one or more of the resource reservation messages is an SCI-1 of a PSCCH reserving one or more resources for a current sidelink transmission. In some examples, one or more of the resource reservation messages is reservation information for one or more future sidelink transmissions included within SCI-1.

The communication and processing circuitry 1442 may further be configured to transmit, via the transceiver 1410, a new sidelink transmission within transmission resources of a set of available resources for data transmission associated with the first RAT selected based on a channel occupancy of the sidelink channel of a second RAT (e.g., LTE sidelink). In some examples, the new sidelink transmission is a sidelink coordination message indicating the set of available resources are preferred resources. In some examples, the new sidelink transmission is a sidelink coordination message indicating other resources outside the set of available resources are non-preferred resources. The communication and processing circuitry 1442 may further be configured to execute communication and processing instructions (software) 1452 stored in the computer-readable medium 1406 to implement one or more of the functions described herein.

The processor 1404 may further include channel occupancy calculation circuitry 1444, configured to estimate a first channel occupancy (e.g., one of the channel occupancies 1416) of the sidelink channel of the second RAT (e.g., LTE sidelink) different than the first RAT (e.g., NR sidelink). In some examples, the channel occupancy calculation circuitry 1444 may be configured to estimate the first channel occupancy based on measurements obtained over a total number of the plurality of resources of the sidelink channel and the at least one resource reservation message.

For example, the channel occupancy calculation circuitry 1444 may be configured to estimate the first channel occupancy by calculating a channel busy ratio (CBR) (e.g., one of the CBRs 1418) of the sidelink channel. The channel occupancy calculation circuitry 1444 may further be configured to determine a second channel occupancy (e.g., one of the channel occupancies 1416) of the sidelink channel associated with the first RAT based on decoding the at least one resource reservation message associated with the first RAT. The channel occupancy calculation circuitry 1444 may then calculate the first channel occupancy based on the CBR and the second channel occupancy. In some examples, the second channel occupancy is based on a first number of the plurality of resources reserved for the respective sidelink transmission associated with each of the at least one resource reservation message. In some examples, the CBR may be calculated over a time window. In this example, the channel occupancy calculation circuitry 1444 may be configured to calculate an occupied amount of the plurality of resources as a product of the channel busy ratio and a product of a number of slots in the time window and the total number of the plurality of resources in a frequency domain per slot. The channel occupancy calculation circuitry 1444 may then be configured to calculate the first channel occupancy as a difference between the occupied amount of the plurality of resources and the second channel occupancy. In some examples, the channel occupancy calculation circuitry 1444 may be configured to determine the second channel occupancy by comparing a respective measurement of each of the at least one resource reservation message to a threshold and determining the first number of the plurality of resources associated with each of the at least one resource reservation message for which the respective measurement is greater than or equal to the threshold. For example, the respective measurement of each of the at least one resource reservation message may be a reference signal received power (RSRP) or a reference signal received quality (RSRQ).

As another example, the channel occupancy calculation circuitry 1444 may be configured to estimate the first channel occupancy by calculating a channel busy ratio of the second RAT (e.g., one of the CBRs 1418) and determining the first channel occupancy of the sidelink channel associated with the second RAT based on the CBR of the second RAT. In some examples, the channel occupancy calculation circuitry 1444 may be configured to determine a second number of the plurality of resources having a measurement greater than a threshold (e.g., one of the threshold(s) 1422) and within which the at least one resource reservation message is absent over a time window. In this example, the channel occupancy calculation circuitry 1444 may be configured to calculate the first channel occupancy as a ratio of the total number of the plurality of resources to the second number of the plurality of resources. In some examples, the measurement may be a received signal strength indicator (RSSI) measured on each of the second number of the plurality of resources.

In some examples, the channel occupancy calculation circuitry 1444 may be configured to estimate the first channel occupancy of the sidelink channel in the second RAT by averaging two or more second RAT channel occupancies, each associated with a respective time window, to obtain the first channel occupancy. In some examples, the two or more second RAT channel occupancies are based on a preconfigured number of time windows. The channel occupancy calculation circuitry 1444 may further be configured to execute channel occupancy calculation instructions (software) 1454 stored in the computer-readable medium 1406 to implement one or more of the functions described herein.

The processor 1404 may further include sidelink resource selection circuitry 1446, configured to identify a set of available resources for data transmission associated with the first RAT based on the first channel occupancy. In some examples, the sidelink resource selection circuitry 1446 may be configured to select the set of available resources from a plurality of sets of available resources, each associated with a respective value of the first channel occupancy. In some examples, the sidelink resource selection circuitry 1446 may access a lookup table (e.g., LUT 1420) mapping the plurality of sets of available resources to corresponding values of the first channel occupancy to select the set of available resources. In other examples, the sidelink resource selection circuitry 1446 may be configured to execute an algorithm (e.g., stored within sidelink resource selection instructions (software) 1456) to map the first channel occupancy to the set of available resources. In some examples, the set of available resources includes one or more first resources configured to include sidelink control information and sidelink data and one or more second resources configured to further include sidelink feedback information. In some examples, the set of available resources may repeat based on a periodicity of available resources.

In some examples, the sidelink resource selection circuitry 1446 may further be configured to select transmission resources within the set of available resources for transmission of the new sidelink transmission via the communication and processing circuitry 1442. The sidelink resource selection circuitry 1446 may further be configured to execute the sidelink resource selection instructions (software) 1456 stored in the computer-readable medium 1406 to implement one or more of the functions described herein.

Figure 15:
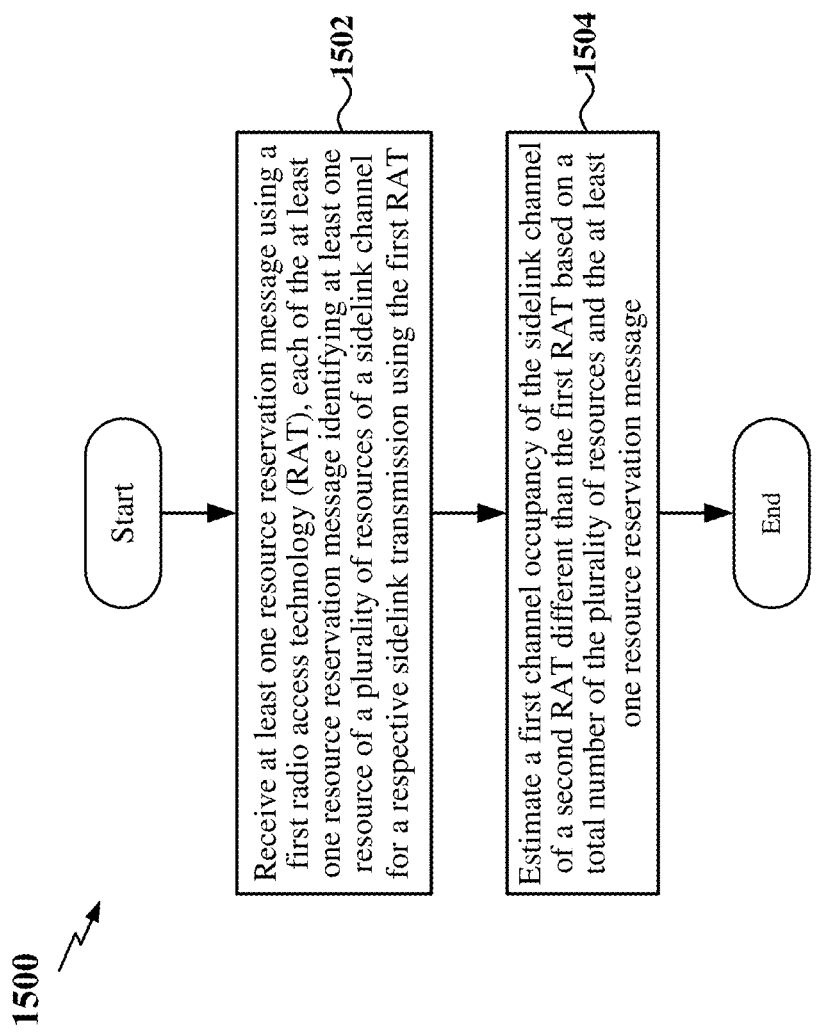
FIG. 15 is a flow chart of an exemplary process for co-channel coexistence between different RATs for sidelink communication according to some aspects.

FIG. 15 is a flow chart of an exemplary process 1500 for co-channel coexistence between different RATs for sidelink communication according to some aspects. As described below, some or all illustrated features may be omitted in a particular implementation within the scope of the present disclosure, and some illustrated features may not be required for implementation of all examples. In some examples, the method may be performed by the wireless communication device 1400, as described above and illustrated in FIG. 14, by a processor or processing system, or by any suitable means for carrying out the described functions.

At block 1502, the wireless communication device may receive at least one resource reservation message using a first radio access technology (RAT). Each of the at least one resource reservation message can identify at least one resource of a plurality of resources of a sidelink channel for a respective sidelink transmission using the first RAT. For example, the first RAT may be NR sidelink. In some examples, each of the at least one resource reservation message includes reservation information within first stage sidelink control information. For example, the communication and processing circuitry 1442 and transceiver 1410 shown and described above in connection with FIG. 14 may provide a means to receive the at least one resource reservation message.

At block 1504, the wireless communication device may estimate a first channel occupancy of the sidelink channel of a second RAT different than the first RAT based on a total number of the plurality of resources and the at least one resource reservation message. In some examples, the wireless communication device may estimate the first channel occupancy by calculating a channel busy ratio of the sidelink channel, determining a second channel occupancy of the sidelink channel associated with the first RAT based on decoding the at least one resource reservation message associated with the first RAT, and calculating the first channel occupancy based on the channel busy ratio and the second channel occupancy.

For example, the second channel occupancy may be based on a first number of the plurality of resources reserved for the respective sidelink transmission associated with each of the at least one resource reservation message. In some examples, the wireless communication device may calculate the channel busy ratio of the sidelink channel over a time window, calculate an occupied amount of the plurality of resources as a product of the channel busy ratio and a product of a number of slots in the time window and the total number of the plurality of resources in a frequency domain per slot, and calculate the first channel occupancy as a difference between the occupied amount of the plurality of resources and the second channel occupancy. In some examples, the wireless communication device may compare a respective measurement of each of the at least one resource reservation message to a threshold and determine the first number of the plurality of resources associated with each of the at least one resource reservation message for which the respective measurement is greater than or equal to the threshold. In some examples, the respective measurement of each of the at least one resource reservation message includes a reference signal received power (RSRP) or a reference signal received quality (RSRP).

In other examples, the wireless communication device may estimate the first channel occupancy by calculating a channel busy ratio of the second RAT and determining the first channel occupancy of the sidelink channel associated with the second RAT based on the channel busy ratio. In some examples, the wireless communication device may determine a second number of the plurality of resources having a measurement greater than a threshold and within which the at least one resource reservation message is absent over a time window. In this example, the wireless communication device may calculate the first channel occupancy as a ratio of the total number of the plurality of resources to the second number of the plurality of resources. In some examples, the measurement may include a received signal strength indicator (RSSI).

In some examples, the wireless communication device may average two or more second RAT channel occupancies, each associated with a respective time window, to obtain the first channel occupancy. For example, the two or more second RAT channel occupancies may be based on a pre-configured number of time windows. For example, the channel occupancy calculation circuitry 1444, shown and described above in connection with FIG. 14, may provide a means to estimate the first channel occupancy.

Figure 16:
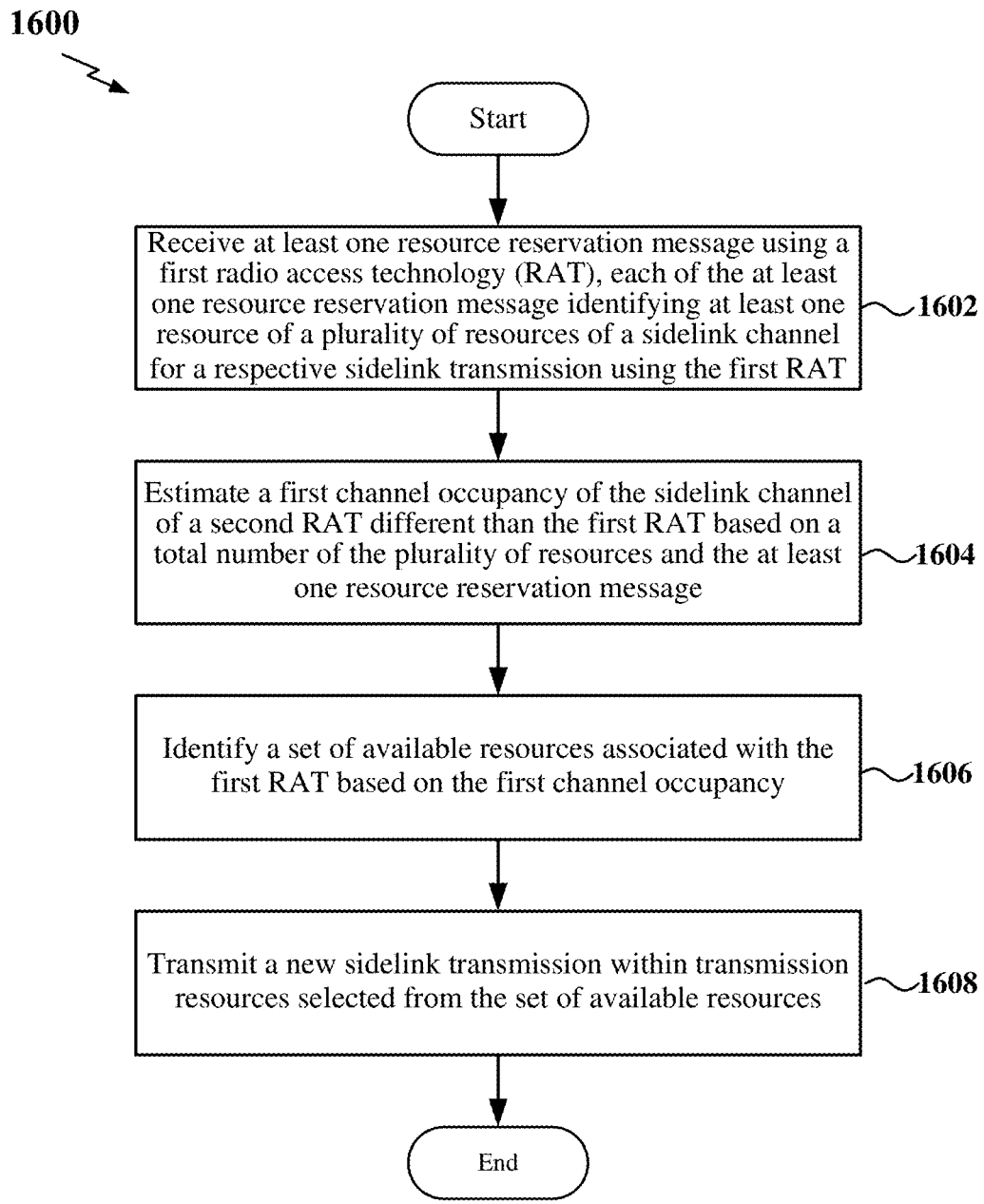
FIG. 16 is a flow chart of another exemplary process for co-channel coexistence between different RATs for sidelink communication according to some aspects.

FIG. 16 is a flow chart of another exemplary process 1600 for co-channel coexistence between different RATs for sidelink communication according to some aspects. As described below, some or all illustrated features may be omitted in a particular implementation within the scope of the present disclosure, and some illustrated features may not be required for implementation of all examples. In some examples, the method may be performed by the wireless communication device 1400, as described above and illustrated in FIG. 14, by a processor or processing system, or by any suitable means for carrying out the described functions.

At block 1602, the wireless communication device may receive at least one resource reservation message using a first radio access technology (RAT). Each of the at least one resource reservation message can identify at least one resource of a plurality of resources of a sidelink channel for a respective sidelink transmission using the first RAT. For example, the first RAT may be NR sidelink. In some examples, each of the at least one resource reservation message includes reservation information within first stage sidelink control information. For example, the communication and processing circuitry 1442 and transceiver 1410 shown and described above in connection with FIG. 14 may provide a means to receive the at least one resource reservation message.

At block 1604, the wireless communication device may estimate a first channel occupancy of the sidelink channel of a second RAT different than the first RAT based on a total number of the plurality of resources and the at least one resource reservation message. In some examples, the wireless communication device may estimate the first channel occupancy by calculating a channel busy ratio of the sidelink channel, determining a second channel occupancy of the sidelink channel associated with the first RAT based on decoding the at least one resource reservation message associated with the first RAT, and calculating the first channel occupancy based on the channel busy ratio and the second channel occupancy.

For example, the second channel occupancy may be based on a first number of the plurality of resources reserved for the respective sidelink transmission associated with each of the at least one resource reservation message. In some examples, the wireless communication device may calculate the channel busy ratio of the sidelink channel over a time window, calculate an occupied amount of the plurality of resources as a product of the channel busy ratio and a product of a number of slots in the time window and the total number of the plurality of resources in a frequency domain per slot, and calculate the first channel occupancy as a difference between the occupied amount of the plurality of resources and the second channel occupancy. In some examples, the wireless communication device may compare a respective measurement of each of the at least one resource reservation message to a threshold and determine the first number of the plurality of resources associated with each of the at least one resource reservation message for which the respective measurement is greater than or equal to the threshold. In some examples, the respective measurement of each of the at least one resource reservation message includes a reference signal received power (RSRP) or a reference signal received quality (RSRP).

In other examples, the wireless communication device may estimate the first channel occupancy by calculating a channel busy ratio of the second RAT and determining the first channel occupancy of the sidelink channel associated with the second RAT based on the channel busy ratio. In some examples, the wireless communication device may determine a second number of the plurality of resources having a measurement greater than a threshold and within which the at least one resource reservation message is absent over a time window. In this example, the wireless communication device may calculate the first channel occupancy as a ratio of the total number of the plurality of resources to the second number of the plurality of resources. In some examples, the measurement may include a received signal strength indicator (RSSI).

In some examples, the wireless communication device may average two or more second RAT channel occupancies, each associated with a respective time window, to obtain the first channel occupancy. For example, the two or more second RAT channel occupancies may be based on a pre-configured number of time windows. For example, the channel occupancy calculation circuitry 1444, shown and described above in connection with FIG. 14, may provide a means to estimate the first channel occupancy.

At block 1606, the wireless communication device may identify a set of available resources associated with the first RAT based on the first channel occupancy. In some examples, the wireless communication device may select the set of available resources from a plurality of sets of available resources, each associated with a respective value of the first channel occupancy. In some examples, the wireless communication device may select the set of available resources based on a lookup table mapping the plurality of sets of available resources to corresponding respective values of the first channel occupancy. In some examples, the wireless communication device may select the set of available resources based on an algorithm mapping the plurality of sets of available resources to corresponding respective values of the first channel occupancy. In some examples, the set of available resources includes one or more first resources configured to include sidelink control information and sidelink data and one or more second resources configured to further include sidelink feedback information. In some examples, the set of available resources repeats based on a periodicity of available resources. For example, the sidelink resource selection circuitry 1446 shown and described above in connection with FIG. 14 may provide a means to identify a set of available resources.

At block 1608, the wireless communication device may transmit a new sidelink transmission within transmission resources selected from the set of available resources. In some examples, the new sidelink transmission may include a sidelink coordination message sent to at least one additional wireless communication device indicating the set of available resources are preferred resources. In some examples, the new sidelink transmission may include a sidelink coordination message sent to at least one additional wireless communication device indicating other resources outside of the set of available resources are non-preferred resources. For example, the sidelink resource selection circuitry 1146, together with the communication and processing circuitry 1442 and transceiver 1410, shown and described above in connection with FIG. 14, may provide a means to transmit the new sidelink transmission.

In one configuration, the wireless communication device 1400 includes means for receiving at least one resource reservation message using a first radio access technology (RAT), each of the at least one resource reservation message identifying at least one resource of a plurality of resources of a sidelink channel for a respective sidelink transmission using the first RAT, and means for estimating a first channel occupancy of the sidelink channel of a second RAT different than the first RAT based on measurements obtained over a total number of the plurality of resources and the at least one resource reservation message. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1, 3, 6, 12, and/or 14, and utilizing, for example, the processes and/or algorithms described herein in relation to FIGS. 7, 8, 13, 15, and 16.

The processes and/or algorithms shown in FIGS. 7, 8, 13, 15, and 16 may include additional aspects, such as any single aspect or any combination of aspects described below and/or in connection with one or more other processes described elsewhere herein.

Aspect 1: A method for wireless communication at a wireless communication device, the method comprising: receiving at least one resource reservation message using a first radio access technology (RAT), each of the at least one resource reservation message identifying at least one resource of a plurality of resources of a sidelink channel for a respective sidelink transmission using the first RAT; and estimating a first channel occupancy of the sidelink channel of a second RAT different than the first RAT based on measurements obtained over a total number of the plurality of resources and the at least one resource reservation message.

Aspect 2: The method of aspect 1, wherein the estimating the first channel occupancy of the sidelink channel by the second RAT further comprises: calculating a channel busy ratio of the sidelink channel; determining a second channel occupancy of the sidelink channel associated with the first RAT based on decoding the at least one resource reservation message associated with the first RAT; and calculating the first channel occupancy based on the channel busy ratio and the second channel occupancy.

Aspect 3: The method of aspect 2, wherein the second channel occupancy is based on a first number of the plurality of resources reserved for the respective sidelink transmission associated with each of the at least one resource reservation message.

Aspect 4: The method of aspect 3, wherein each of the at least one resource reservation message comprises reservation information within first stage sidelink control information.

Aspect 5: The method of aspect 3 or 4, wherein the calculating the channel busy ratio of the sidelink channel further comprises: calculating the channel busy ratio of the sidelink channel over a time window, and wherein the calculating the first channel occupancy further comprises: calculating an occupied amount of the plurality of resources as a product of the channel busy ratio and a product of a number of slots in the time window and the total number of the plurality of resources in a frequency domain per slot; and calculating the first channel occupancy as a difference between the occupied amount of the plurality of resources and the second channel occupancy.

Aspect 6: The method of any of aspects 3 through 5, wherein the determining the second channel occupancy further comprises: comparing a respective measurement of each of the at least one resource reservation message to a threshold; and determining the first number of the plurality of resources associated with each of the at least one resource reservation message for which the respective measurement is greater than or equal to the threshold.

Aspect 7: The method of aspect 6, wherein the respective measurement of each of the at least one resource reservation message comprises a reference signal received power (RSRP) or a reference signal received quality (RSRQ).

Aspect 8: The method of aspect 1, wherein the estimating the first channel occupancy of the sidelink channel in the second RAT further comprises: calculating a channel busy ratio of the second RAT; and determining the first channel occupancy of the sidelink channel associated with the second RAT based on the channel busy ratio.

Aspect 9: The method of aspect 8, wherein the calculating the channel busy ratio of the second RAT further comprises: determining a second number of the plurality of resources having a measurement greater than a threshold and within which the at least one resource reservation message is absent over a time window, and wherein the determining the first channel occupancy of the sidelink channel associated with the second RAT further comprises: calculating the first channel occupancy as a ratio of the total number of the plurality of resources to the second number of the plurality of resources.

Aspect 10: The method of aspect 9, wherein the measurement comprises a received signal strength indicator (RSSI).

Aspect 11: The method of any of aspects 1 through 10, wherein the estimating the first channel occupancy of the sidelink channel in the second RAT further comprises: averaging two or more second RAT channel occupancies, each associated with a respective time window, to obtain the first channel occupancy.

Aspect 12: The method of aspect 11, wherein the two or more second RAT channel occupancies are based on a preconfigured number of time windows.

Aspect 13: The method of any of aspects 1 through 12, further comprising: identifying a set of available resources for data transmission associated with the first RAT based on the first channel occupancy; and transmitting a new sidelink transmission within transmission resources selected from the set of available resources.

Aspect 14: The method of aspect 13, wherein the identifying the set of available resources for the new sidelink transmission in the first RAT further comprises: selecting the set of available resources from a plurality of sets of available resources, each associated with a respective value of the first channel occupancy.

Aspect 15: The method of aspect 14, wherein the selecting the set of available resources from the plurality of sets of available resources further comprises: selecting the set of available resources based on a lookup table mapping the plurality of sets of available resources to corresponding respective values of the first channel occupancy.

Aspect 16: The method of aspect 14, wherein the selecting the set of available resources from the plurality of sets of available resources further comprises: selecting the set of available resources based on an algorithm mapping the plurality of sets of available resources to corresponding respective values of the first channel occupancy.

Aspect 17: The method of any of aspects 13 through 16, wherein the set of available resources comprises one or more first resources configured to comprise sidelink control information and sidelink data and one or more second resources configured to further comprise sidelink feedback information.

Aspect 18: The method of any of aspects 13 through 17, wherein the set of available resources repeats based on a periodicity of available resources.

Aspect 19: The method of any of aspects 13 through 18, wherein the new sidelink transmission comprises a sidelink coordination message sent to at least one additional wireless communication device indicating the set of available resources are preferred resources.

Aspect 20: The method of any of aspects 13 through 18, wherein the new sidelink transmission comprises a sidelink coordination message sent to at least one additional wireless communication device indicating other resources outside of the set of available resources are non-preferred resources.

Aspect 21: A wireless communication device comprising a transceiver, a memory, and a processor coupled to the transceiver and the memory, the processor configured to perform a method of any one of aspects 1 through 20.

Aspect 22: A wireless communication device comprising means for performing a method of any one of aspects 1 through 20.

Aspect 23: A non-transitory computer-readable medium having stored therein instructions executable by one or more processors of a wireless communication device to perform a method of any one of aspects 1 through 20.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 6, 12, and/or 14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A wireless communication device configured for wireless communication, comprising:
   one or more transceivers;
   one or more memories; and
   one or more processors coupled to the one or more transceivers and the one or more memories, wherein the one or more processors are configured to cause the wireless communication device to:
      receive at least one resource reservation message using a first radio access technology (RAT), each of the at least one resource reservation message identifying at least one resource of a plurality of resources of a sidelink channel for a respective sidelink transmission using the first RAT;
      estimate a first channel occupancy of the sidelink channel of a second RAT different than the first RAT based on measurements obtained over a total number of the plurality of resources and the at least one resource reservation message;
      identify a set of available resources for data transmission associated with the first RAT based on the first channel occupancy; and
      transmit a new sidelink transmission within transmission resources selected from the set of available resources.

2. The wireless communication device of claim 1, wherein the one or more processors are further configured to cause the wireless communication device to:
   calculate a channel busy ratio of the sidelink channel;
   determine a second channel occupancy of the sidelink channel associated with the first RAT based on decoding the at least one resource reservation message associated with the first RAT; and
   calculate the first channel occupancy based on the channel busy ratio and the second channel occupancy.

3. The wireless communication device of claim 2, wherein the second channel occupancy is based on a first number of the plurality of resources reserved for the respective sidelink transmission associated with each of the at least one resource reservation message.

4. The wireless communication device of claim 3, wherein each of the at least one resource reservation message comprises reservation information within first stage sidelink control information.

5. The wireless communication device of claim 3, wherein the one or more processors are further configured to cause the wireless communication device to:
   calculate the channel busy ratio of the sidelink channel over a time window;
   calculate an occupied amount of the plurality of resources as a product of the channel busy ratio and a product of a number of slots in the time window and the total number of the plurality of resources in a frequency domain per slot; and
   calculate the first channel occupancy as a difference between the occupied amount of the plurality of resources and the second channel occupancy.

6. The wireless communication device of claim 3, wherein the one or more processors are further configured to cause the wireless communication device to:
   compare a respective measurement of each of the at least one resource reservation message to a threshold; and
   determine the first number of the plurality of resources associated with each of the at least one resource reservation message for which the respective measurement is greater than or equal to the threshold.

7. The wireless communication device of claim 6, wherein the respective measurement of each of the at least one resource reservation message comprises a reference signal received power (RSRP) or a reference signal received quality (RSRQ).

8. The wireless communication device of claim 1, wherein the one or more processors are further configured to cause the wireless communication device to:
   calculate a channel busy ratio of the second RAT; and
   determine the first channel occupancy of the sidelink channel associated with the second RAT based on the channel busy ratio.

9. The wireless communication device of claim 8, wherein the one or more processors are further configured to cause the wireless communication device to:
   determine a second number of the plurality of resources having a measurement greater than a threshold and within which the at least one resource reservation message is absent over a time window; and
   calculate the first channel occupancy as a ratio of the total number of the plurality of resources to the second number of the plurality of resources.

10. The wireless communication device of claim 9, wherein the measurement comprises a received signal strength indicator (RSSI).

11. The wireless communication device of claim 1, wherein the one or more processors are further configured to cause the wireless communication device to:
   average two or more second RAT channel occupancies, each associated with a respective time window, to obtain the first channel occupancy.

12. The wireless communication device of claim 11, wherein the two or more second RAT channel occupancies are based on a preconfigured number of time windows.

13. The wireless communication device of claim 1, wherein the one or more processors are further configured to cause the wireless communication device to:
   select the set of available resources from a plurality of sets of available resources, each associated with a respective value of the first channel occupancy.

14. The wireless communication device of claim 13, wherein the one or more processors are further configured to cause the wireless communication device to:
   select the set of available resources based on a lookup table mapping the plurality of sets of available resources to corresponding respective values of the first channel occupancy.

15. The wireless communication device of claim 13, wherein the one or more processors are further configured to cause the wireless communication device to:

select the set of available resources based on an algorithm mapping the plurality of sets of available resources to corresponding respective values of the first channel occupancy.

16. The wireless communication device of claim 1, wherein the set of available resources comprises one or more first resources configured to comprise sidelink control information and sidelink data and one or more second resources configured to further comprise sidelink feedback information.

17. The wireless communication device of claim 1, wherein the set of available resources repeats based on a periodicity of available resources.

18. The wireless communication device of claim 1, wherein the new sidelink transmission comprises a sidelink coordination message sent to at least one additional wireless communication device indicating the set of available resources are preferred resources.

19. The wireless communication device of claim 1, wherein the new sidelink transmission comprises a sidelink coordination message sent to at least one additional wireless communication device indicating other resources outside of the set of available resources are non-preferred resources.

20. A method for wireless communication at a wireless communication device, the method comprising:
receiving at least one resource reservation message using a first radio access technology (RAT), each of the at least one resource reservation message identifying at least one resource of a plurality of resources of a sidelink channel for a respective sidelink transmission using the first RAT;
estimating a first channel occupancy of the sidelink channel of a second RAT different than the first RAT based on measurements obtained over a total number of the plurality of resources and the at least one resource reservation message;
identifying a set of available resources for data transmission associated with the first RAT based on the first channel occupancy; and
transmitting a new sidelink transmission within transmission resources selected from the set of available resources.

21. The method of claim 20, wherein the estimating the first channel occupancy of the sidelink channel of the second RAT further comprises:
calculating a channel busy ratio of the sidelink channel;
determining a second channel occupancy of the sidelink channel associated with the first RAT based on decoding the at least one resource reservation message associated with the first RAT; and
calculating the first channel occupancy based on the channel busy ratio and the second channel occupancy.

22. The method of claim 21, wherein the second channel occupancy is based on a first number of the plurality of resources reserved for the respective sidelink transmission associated with each of the at least one resource reservation message.

23. The method of claim 22, wherein the calculating the channel busy ratio of the sidelink channel further comprises:
calculating the channel busy ratio of the sidelink channel over a time window, and wherein the calculating the first channel occupancy further comprises:
calculating an occupied amount of the plurality of resources as a product of the channel busy ratio and a product of a number of slots in the time window and the total number of the plurality of resources in a frequency domain per slot; and
calculating the first channel occupancy as a difference between the occupied amount of the plurality of resources and the second channel occupancy.

24. The method of claim 22, wherein the determining the second channel occupancy further comprises:
comparing a respective measurement of each of the at least one resource reservation message to a threshold; and
determining the first number of the plurality of resources associated with each of the at least one resource reservation message for which the respective measurement is greater than or equal to the threshold.

25. The method of claim 20, wherein the estimating the first channel occupancy of the sidelink channel of the second RAT further comprises:
calculating a channel busy ratio of the second RAT; and
determining the first channel occupancy of the sidelink channel associated with the second RAT based on the channel busy ratio.

26. The method of claim 25, wherein the calculating the channel busy ratio of the second RAT further comprises:
determining a second number of the plurality of resources having a measurement greater than a threshold and within which the at least one resource reservation message is absent over a time window, and wherein the determining the first channel occupancy of the sidelink channel associated with the second RAT further comprises:
calculating the first channel occupancy as a ratio of the total number of the plurality of resources to the second number of the plurality of resources.

27. The method of claim 20, wherein the identifying the set of available resources for the new sidelink transmission in the first RAT further comprises:
selecting the set of available resources from a plurality of sets of available resources, each associated with a respective value of the first channel occupancy.

28. A wireless communication device configured for wireless communication, comprising:
means for receiving at least one resource reservation message using a first radio access technology (RAT), each of the at least one resource reservation message identifying at least one resource of a plurality of resources of a sidelink channel for a respective sidelink transmission using the first RAT;
means for estimating a first channel occupancy of the sidelink channel of a second RAT different than the first RAT based on measurements obtained over a total number of the plurality of resources and the at least one resource reservation message;
means for identifying a set of available resources for data transmission associated with the first RAT based on the first channel occupancy; and
means for transmitting a new sidelink transmission within transmission resources selected from the set of available resources.

* * * * *